United States Patent [19]

Hopper et al.

[11] Patent Number: 5,367,609
[45] Date of Patent: Nov. 22, 1994

[54] EDITING COMPRESSED AND DECOMPRESSED VOICE INFORMATION SIMULTANEOUSLY

[75] Inventors: Andrew B. Hopper, Palo Alto, Calif.; Dario Pessia, La Gaude, France

[73] Assignee: International Business Machines Corporation, Armonk, N.Y.

[21] Appl. No.: 22,785

[22] Filed: Feb. 23, 1993

Related U.S. Application Data

[63] Continuation of Ser. No. 606,798, Oct. 30, 1990, abandoned.

[51] Int. Cl.$^5$ .............................................. G10L 9/00
[52] U.S. Cl. .................................................. 395/2.87
[58] Field of Search .................................. 381/41–52; 395/2.87, 2.79; 382/57; 341/50, 60

[56] References Cited

U.S. PATENT DOCUMENTS

| | | | |
|---|---|---|---|
| 4,375,083 | 2/1983 | Maxemchuk | 364/900 |
| 4,868,687 | 9/1989 | Penn et al. | 360/14.1 |
| 5,164,839 | 11/1992 | Lang | 358/335 |

OTHER PUBLICATIONS

J. Gosch, "Voice–Synthesizer Editor Displays Speech As Curves Easily Alterable By Keyboard", Electronics, vol. 55, No. 17, 25 Aug. 1982, pp. 68–70.

Nicholson, "Integrating Voice in the Office World", pp. 1–4, Byte, Dec. 1983.

Primary Examiner—Allen R. MacDonald
Assistant Examiner—Michelle Doerrler
Attorney, Agent, or Firm—L. Keith Stephens; Leslie G. Murray

[57] ABSTRACT

A method and apparatus for editing the displayed voice wave form by marking the portion of interest on the screen is disclosed. Marked segment may then be deleted, for example, or copied into another segment in second voice editing window. In either case, pointers are established at the selected marker positions of the displayed voice segment and in the corresponding positions of uncompressed voice segments. The voice data is treated as a stream of fixed-length micro-segments, where there is a predictable correlation between the positions of the compressed and uncompressed data. In the implementation at hand, these micro-segments are 20 ms. in length. Editing is accomplished by modifying micro-segments in both the compressed and uncompressed segments simultaneously. When the user is satisfied with the result, the edited wave form is redrawn on the screen. The user may then SAVE the result, and the entire segment is rewritten to the data base, replacing the previous version. Only the compressed version is written, thus eliminating the need for a subsequent pass through the compression hardware with the associated compounding of distortion.

14 Claims, 14 Drawing Sheets

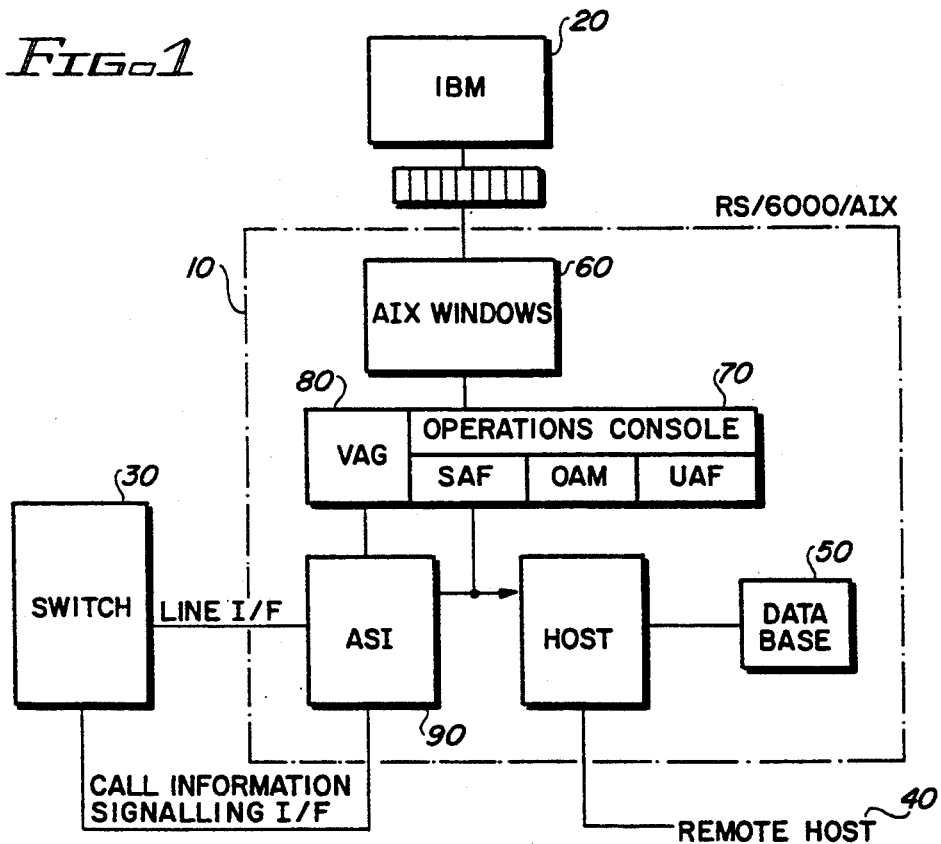
FIG. 1
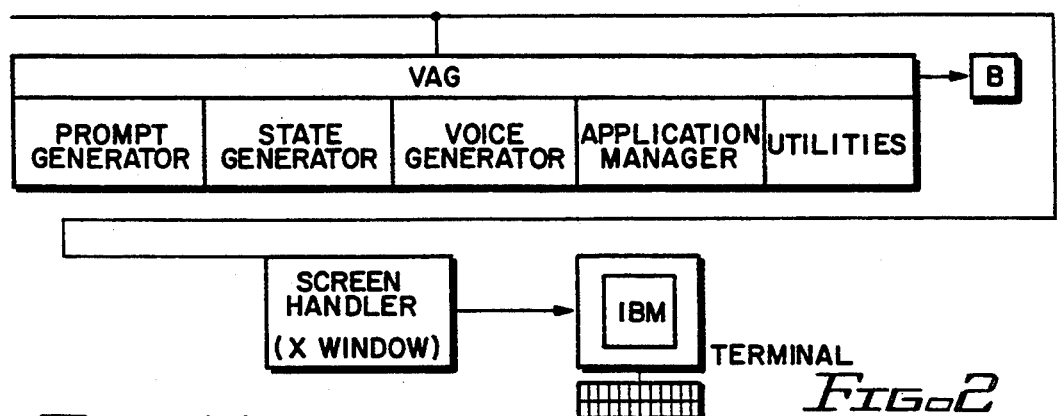
FIG. 2
FIG. 11
| STATE | ACTION | EDGES 00 | 01 | 02 | 03 | 04 | 05 | 06 | 07 | 08 | 09 | 10 | 11 | 12 | 13 | 14 |
|---|---|---|---|---|---|---|---|---|---|---|---|---|---|---|---|---|
| 0 | --- | 1 | 1 | 1 | 1 | 1 | 1 | 1 | 1 | 1 | 1 | 1 | 1 | 1 | 1 | 1 |
| 1 | IDLE | 2 | 3 | 0 | 0 | 0 | 0 | 0 | 0 | 0 | 0 | 0 | 0 | 0 | 0 | 4 |
| 2 | ANSWER CALL | 4 | 0 | 0 | 0 | 0 | 0 | 0 | 0 | 0 | 0 | 0 | 0 | 0 | 0 | 4 |
| 3 | PLACE CALL | 4 | 0 | 0 | 0 | 0 | 0 | 0 | 0 | 0 | 0 | 0 | 0 | 0 | 0 | 4 |
| 4 | END CALL | 1 | 0 | 0 | 0 | 0 | 0 | 0 | 0 | 0 | 0 | 0 | 0 | 0 | 0 | 0 |

STATE TABLE NUMBER: 001     RELEASE NUMBER: 00     PURPOSE: BUS SCHEDULE SCRIPT

| STATE | ACTION | PARAMETER(S) DESCRIPTION | CONDITION | EDGE | NEXT STATE |
|---|---|---|---|---|---|
| 1 | PP | PLAY GREETING<br>PARAMETER: 1 | COMPLETED SUCCESSFULLY<br>VOICE CHANNEL PROBLEM<br>HANG UP DETECTED | 0<br>1<br>HUP | 2<br>30<br>40 |
| 2 | PP | PLAY "ENTER CITY CODE"<br>PARAMETER: 2 | COMPLETED SUCCESSFULLY<br>VOICE CHANNEL PROBLEM<br>HANG UP DETECTED | 0<br>1<br>HUP | 3<br>30<br>40 |
| 3 | GD | GET FROM_CITY CODE<br>PARAMETERS: 1, 1, 10 | INPUT COMPLETE<br>INPUT TOO SHORT<br>INPUT TOO LONG<br>INPUT INCOMPLETE, TIME OUT OCCURRED<br>INPUT NOT STARTED, TIME OUT OCCURRED<br>LAST TIME OUT<br>HANG UP DETECTED | 0<br>1<br>2<br>3<br>T1<br>T2<br>HUP | 4<br>50<br>60<br>70<br>-1<br>30<br>40 |
| 4 | SD | SEND GET_CITY CODE TO SERV.<br>PARAMETERS: 1100, 100, 1 | COMPLETED SUCCESSFULLY, HANG UP DETECTED<br>HANG UP DETECTED | 0<br>HUP | 5<br>30 |
| 5 | RD | RECEIVE GET_CITY SEGMENT ID<br>PARAMETERS: 1100, 100, 30, 2 | COMPLETED SUCCESSFULLY<br>HOST RETURNED INVALID REQUEST<br>HOST PROBLEM<br>TIME OUT WAITING FOR SERVER REPLY<br>HANG UP DETECTED | 0<br>1<br>2<br>T1<br>HUP | 6<br>80<br>90<br>90<br>30 |
| 6 | PP | PLAY "YOU WILL TRAVEL FROM"<br>PARAMETER: 3 | COMPLETED SUCCESSFULLY<br>VOICE CHANNEL PROBLEM<br>HANG UP DETECTED | 0<br>1<br>HUP | 7<br>30<br>40 |

*FIG. 4*

EDITING COMPRESSED AND DECOMPRESSED VOICE INFORMATION SIMULTANEOUSLY

This is a continuation of co-pending application Ser. No. 07/606,798 filed on Oct. 30, 1990, now abandoned.

FIELD OF THE INVENTION

This invention generally relates to improvements in voice messaging and more particularly to editing voice information without affecting the fidelity of the original voice information.

BACKGROUND OF THE INVENTION

Information processing systems having a voice generating capability are presently employed as answering machines, voice messaging systems, voice response units and in general as intelligent peripherals. The voice signal may be prerecorded on audio tape or may be digitized, compressed and stored, for example, on a magnetic disk.

A typical application couples the information processing system to one or more phone lines, the system detecting the occurrence of a ring signal and answering the phone. Often a standard prompt voice message is sent to the phone line. Depending on the type of system the caller may depress certain buttons on a Touch-Tone phone set in order to inform the system of a specific type of action desired by the user. For example, after hearing the message, the information processing system may have access to a large data base, such as a data base containing stock quotations. The caller may signal the system to access one or more quotations from the data base whereafter the system converts the quotation to an audio voice signal which is output to the caller's phone line.

As can be appreciated, for such systems the interaction between a caller and the system may become quite complex. As a relatively simple example, if the caller desires to learn if any voice messages are stored for the caller the system may respond with a voice signal such as "you have three new voice messages". In generating this response the number "three" is a variable which is determinable at the time that the caller is connected to the system.

Furthermore, the word "messages" is also a variable in that if only one voice message is pending the singular form "message" should be returned and not the plural form. It can thus be appreciated that the ability to accurately define a series of system responses to an incoming call is an important aspect of such a voice response system.

Also, it is preferable that a voice applications writer be able to create and modify the system responses in a relatively uncomplicated and time efficient manner. That is, the operator of the system should be able to interact with the voice response system to create and modify voice responses in a manner which does not require the direct assistance of the provider of the system or the direct assistance of skilled programming personnel.

Many business applications can be automated with voice processing technology. A business can use voice processing equipment to call its clients and deliver or solicit information. Alternatively, business customers can call into a firm's voice processing unit to obtain information, place orders, or transfer to human service agents or other response equipment. Other applications can employ voice processing equipment to exchange information with other call handling equipment without human intervention.

In most cases, the call originating or call transferring automated equipment must be able to communicate information to a user on the basis of dynamic information entered by a user. An example of a prior art call processing system that can benefit from incorporating the subject invention is U.S. Pat. No. 4,627,001, which discloses a voice editing data system using a display system for editing recorded speech. U.S. Pat. No. 4,779,209 discloses another system for editing voice data. U.S. Pat. No. 4,853,952 discloses yet one more text editing system for editing recorded voice signals. U.S. Pat. No. 4,766,604 discloses yet another voice message handling system which includes voice prompts. Finally, U.S. Pat. No. 4,920,558 describes a speech file downloading system wherein static voice prompts are recorded.

All of the aforementioned systems have a common shortcoming. They have no dynamic voice prompt capability. The subject invention overcomes this limitation by providing dynamic voice prompts.

SUMMARY OF THE INVENTION

In a voice-based computer application system it is often necessary to edit recorded voice prompts in order to produce natural-sounding results. However, this voice data is typically stored in compressed form in order to minimize data traffic and storage consumption within the system. Moreover, repetitive editing of the same voice information introduces increasing distortion into the edited result owing to the approximations in the compression and decompression techniques involved. These distortions may be particularly severe in high-rate compression.

It is desirable, therefore, to employ a method of editing which does not require repetitive compression and decompression cycles. The invention employed by the Voice Application Generator (VAG) introduces such a method.

Using the Voice Application Generator tool, the user (i.e., the person performing the voice editing) invokes the voice generation screen. She selects the segment of interest, and the "modify" option. A window is opened and the analog wave form of the selected voice segment is presented. This wave form is created by causing the selected compressed voice segment to be looped through voice decompression hardware and returned in clear channel (i.e., uncompressed) form. Both the compressed and decompressed voice forms are retained in memory.

The user proceeds to edit the displayed voice wave form by marking the portion of interest on the screen. Tools are available (e.g., ZOOM) to improve the user's ability to identify the exact position to be marked. The marked segment may then be deleted, for example, or copied into another segment in second voice editing window. In either case, pointers are established at the selected marker positions of the displayed voice segment and in the corresponding positions of uncompressed voice segments.

The voice data is treated as a stream of fixed-length micro-segments, where there is a predictable correlation between the positions of the compressed and uncompressed data. In the implementation at hand, these micro-segments are 20 ms. in length. Editing is accomplished by modifying micro-segments in both the compressed and uncompressed segments simultaneously.

When the user is satisfied with the result, the edited wave form is redrawn on the screen. The user may then SAVE the result, and the entire segment is rewritten to the data base, replacing the previous version, Only the compressed version is written, thus eliminating the need for a subsequent pass through the compression hardware with the associated compounding of distortion.

BRIEF DESCRIPTION OF THE DRAWINGS

FIG. 1 is a system diagram of the voice application enabler apparatus in accordance with the subject invention;

FIG. 2 is a system diagram of the internal components of the voice application generator in accordance with the subject invention;

FIG. 4 is a block diagram of a state table in accordance with the subject invention;

FIG. 11 is an internal state table in accordance with the subject invention;

FIG. 13 is a block diagram of the national language support parameter numbers in accordance with the subject invention;

DETAILED DESCRIPTION OF THE INVENTION

Figure 3:
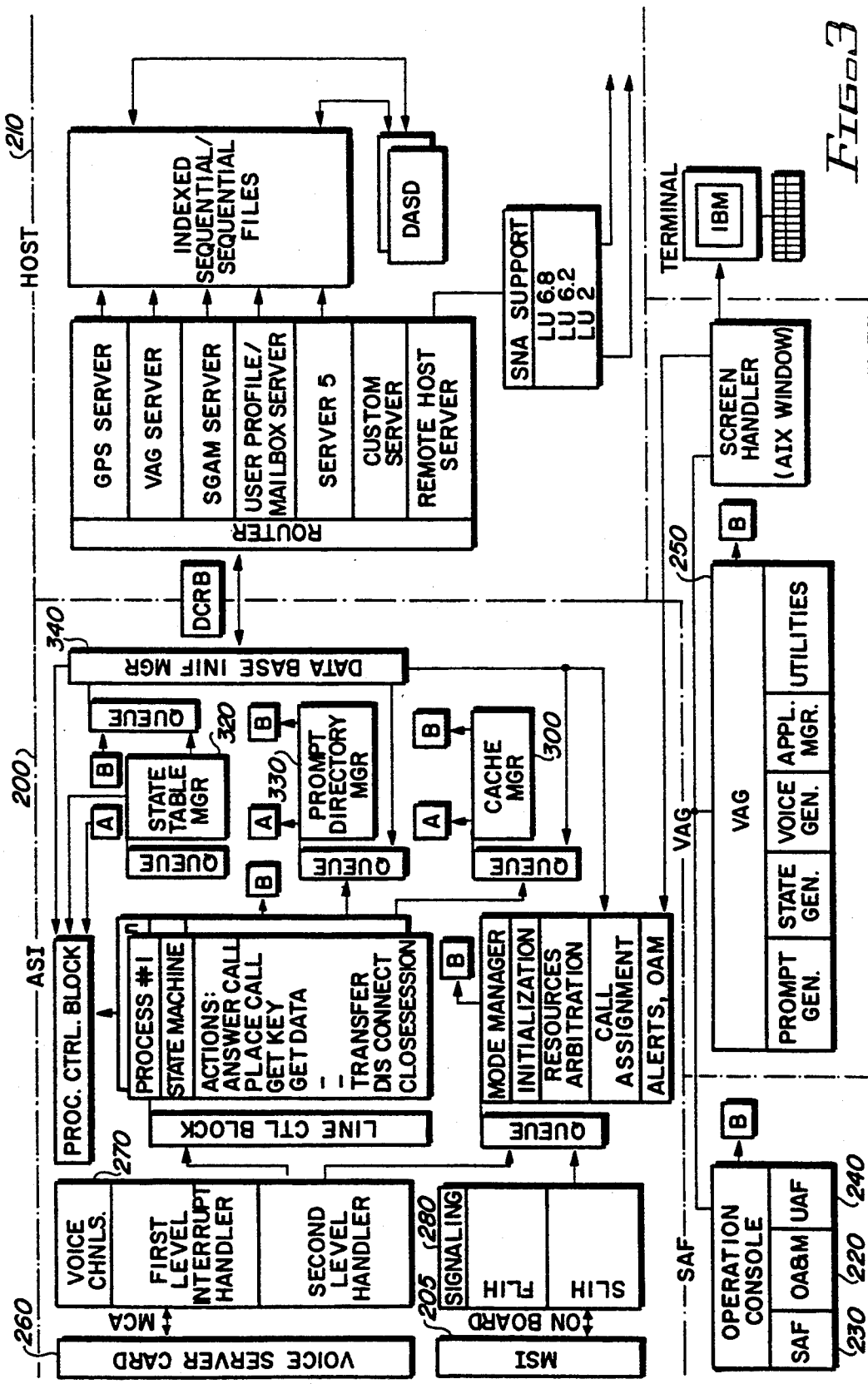
FIG. 3 is a system diagram of the internal components of the voice application enabler in accordance with the subject invention.

Referring to FIG. 1, the apparatus for performing a voice related application includes an RISC System/6000 10 with on board RAM for executing a variety of applications including AIXwindows 60, Voice Applications Enabler (VAE) 70, and a data base 50 for storing and transferring static and dynamic voice information to the memory of the RISC System/6000. The data base 50 also contains means for storing rules for vocalizing the voice information. The rules are interpreted by the Voice Applications Generator (VAG) 80 and used to vocalize the dynamic and static voice messages into the proper user prompt.

Using standard IBM hardware and operating systems, the Voice Application Enabler (VAE) connects callers with application servers and manages the sessions, with the telephone as the interactive medium. Principal elements of the system are the Application Server Interface (ASI), Voice Application Generator (VAG), and the Host, which is a host system providing data base access and storage.

The VAE provides facilities and connectivity for customer implementation of voice-data applications. It uses telephone lines to connect a customer-premises or central office switch to provide dual-tone multi-frequency (DTMF) signalling recognition for state-of-the-art voice compression and decompression. Customers can develop application scripts and voice prompts with an easy-to-use, high level application-specific language or graphic interface and other development tools.

Several publications describe the operating system tools used to implement the invention. *IBM Advanced Interactive Executive for Personal System/2 (AIX PS/2)* IBM AIX Operating System Commands, IBM Publication Number - SC23-2025-0. IBM AIX Operating System; Technical Reference - SC23-2032-0. IBM AIX Operating System; Tools and Interfaces - SC23-2029-0.

The Voice Application Enabler (VAE), Prototype, is designed to support interactive transaction processing and to integrate voice and data applications. The major characteristics of the VAE are:

Telephone switch interfaces;
Advanced voice compression;
Telephone used as interactive medium; and
Application level customer programmability.

The voice-data application addresses two identifiable environments:

Central office (CO) telephone company enhanced service provider; and
Customer premises computer assisted telephony, using a PBX or CO switch.

The VAE provides facilities and connectivity for customer implementation of voice-data applications. It uses telephone lines to connect to a switch, and provides dual-tone multi-frequency (DTMF), switch signalling recognition, and state-of-the-art voice compression and decompression. In addition, it supports rotary dial telephones when voice recognition is operational. Users can develop application scripts and voice prompts with an easy-to-use, high-level, application-specific language or graphics interface, and other development tools. Users can also conduct application sessions with a Host computer using the telephone. Examples of such applications include voice messaging, voice information services, and data base applications.

In the CO environment, generality of function, scalability, reliability and support of multiple switches are critical requirements, while in the customer premises environment, entry cost, broad functionality and multi-switch compatibility are key elements. Both environments share common technological dependencies: multi-channel operations, real-time response, state-of-theart voice compression, and telephone channel signalling recognition and control.

The VAE accommodates a variety of line interface protocols ranging from a few analog voice channels to multiple T1's and Integrated Services Data Network, both domestic and worldwide. It is easily tailored by the customer to suit his or her application.

The VAE is designed as a multi-lingual system. Support is provided for single-byte, left-to-right languages only. Special provisions will be made for other language requirements, such as bidirectional Hebrew and Arabic, or other single- or double-byte languages. The VAE implements enabling language function and translation for hardware and software and for translation of customer and service information, such as messages, help panels, documentation and nomenclature.

Typical Scenario

In a typical scenario, a user calls a telephone number and is directed by the CO switch into the VAE system. The voice system interacts with the user through dynamically assembled voice prompts and phrases, and the user interacts with the voice system through the voice and the DTMF touch pad on his or her telephone.

VAE allows the caller to interact with existing customer data base applications, and to transfer to a live operator when needed. For example, in a voice-messaging application, the user may be prompted to leave or retrieve a message. In a voice response application, he may hear a weather forecast or inquire about his bank balance or order a pizza.

In each case, sub-second response and unbroken voice streams allow users to interact with the system as a single image without regard to call routing. In this way, each customer is able to program the system so that it is user friendly, and interacts with him in a manner appropriate to the application being performed.

T1/CEPT Signalling

VAE is required to interface with a variety of CO switches. The preferred medium is T1-D4 in the United States and CEPT in Europe.

Telephony Interface Protocol

Line information comes from a separate Simplified Message Service Interface (SMSI) channel in each implementation. This signalling also comes from the call setup information from existing tariffed signalling services, such as the SMSI.

As Integrated Services Data Network (ISDN) evolves into general use, the VAE should adopt its interface protocol as the preferred technique. Some CO switches may not support the required interface protocol services in conjunction with the digital T1 service. In such cases, personalized greetings and message waiting indications are not likely to be implemented. To accommodate analog telephone systems a channel bank is required to convert analog signals to digital signals.

Topology and Scalability

The VAE supports voice channels ranging from a few voice channels to over a thousand. Where redundancy and capacity requirements are low, the system is designed to operate on a single, standalone hardware platform. Where they are high, the system design permits n+1 redundancy and distributed function, so that very large configurations retain a single system image to the user.

Design Structure

VAE is an application system, and it operates entirely under AIX, Version 3. VAE operates on IBM RISC Model (Risc System/6000). Users interact with the VAE using a high-level application language consisting of preprogrammed primitives. In addition, the customer will define and program application servers to supplement those provided in the standard release.

Each VAE node will support up to 72 voice channels in the United States and 90 voice channels in Europe. Overall system performance is application dependent. Limited multi-lingual support is intrinsic to the design and will be in place for subsequent releases.

SYSTEM ARCHITECTURE

The VAE system architecture is shown in FIG. 1. The system consists of three logical elements:
Front-end ASI 90;
Back-end Host data base server 50; and
Operations Console (VAG 80, SAF, UAF, and OAM).

The most general manifestation of the system architecture allows for multiple ASI's and Host servers. In the general architecture, the ASI and Host server components are linked using one or more local area networks or by direct attachment to a data base Host.

The hardware base for the subject invention is the IBM RISC System/6000 10. The operating system is RISC/6000/AIX, a UNIX derivative, with significant real time multi-tasking capabilities. The invention employs a back-end data base server 50 designed to exploit a set of sequential files, which are accessed at the field level, and indexed sequential files, which are accessed at the field and/or record level. Field-level access provides relational data base management system capabilities. The function of the data base server is to retrieve and store application scripts, system parameters, voice data, and subscriber and information.

The database server 50 provides intelligent data base services to the ASI and VAG on demand. The data base server function operates on the same physical hardware platform as the ASI application. An architected interface between the ASI functions and the data base server functions is maintained in common for combined and distributed configurations. The data base functions are provided by IBM. A custom server architecture enables customers to define and develop functions of their own design using the same Data Base Management Services as used by the VAE system servers. The peculiarities of the local server implementation, however, is insulated from the ASI by the architected interface.

FUNCTIONAL CHARACTERISTICS

The basic facilities of the VAE system, as illustrated in FIG. 2, provide support to end-user applications including voice information services, voice messaging and voice interactive transaction processing, similar to IBM's Voice Response Unit (VRU). Other operations are built on these basic functions or their variants.

Call Transactions

Call transactions begin with the establishment of an active telephone connection with the CO at the ASI. Identifying call information, such as called party number, determines the selection of a script that describes and controls the specific type of transaction. An ASI is able to handle all types of transactions for all subscribers and callers. There is no prior binding of caller or transaction type to specific servers or to trunks/channels.

The call transaction control function in the ASI follows the script for the duration of the active transaction. The script contains the list of actions to be performed, such as play a prompt or receive digit, and the conditional sequencing of the actions in the list. The action library resides in the ASI and the script, being customizable for each transaction and subscriber, must be fetched from the data base through the Host server. Common prompts are cached in the ASI also, while customized prompts and greetings reside in the data base.

Compression and Decompression

Compression and decompression of voice signals occur within the ASI immediately after receipt from the CO and before being sent back to the CO. Multiplexing and de-multiplexing of the T1/CEPT channel are also done at this point. Thus, the CO always perceives normal voice. DTMF detection is incorporated in the line interface hardware, permitting user interaction with the system.

Digit information is removed from the information the control function. In the case of messaging, the compressed incoming message is stored in the data base in segments during the recording. Recorded messages are retrieved in segments, each decompressed and sent out while successive segments are fetched in a manner ensuring smooth voice regeneration. Prompts, greetings and other voice responses are played back in the same manner.

The compressed voice segments flow over the link between the ASI and Host server. In the Prototype, the link between the ASI and the Host is a logical construct designed to maintain compatibility and configuration flexibility in later releases. Functions in the Host provide data base access and other support needed by the ASI applications, such as updating user profile information. In addition to the voice segments, control information flows between the ASI and Host functions during the transaction.

Application support from the Host may schedule subsequent activity to complete the transaction, such as interpreting and passing the transaction to a remote data base system. The interface provided in the General Purpose Server allows the customer application to interact with the VAE. It receives transaction information from the ASI, activates functions imbedded in the application program, and then returns the results back to the ASI.

MAJOR COMPONENTS

FIG. 3 illustrates the major components of the VAE system:
  Application Server Interface 200;
  Host 210;
  Operations, Administration, and Maintenance (OAM) 220;
  System Administrator Facilities (SAF) 230;
  User Administration Facilities (UAF) 240; and
  Voice Application Generator (VAG) 250.

This section introduces each of these components with a brief description. Following the VAG section is a section listing and describing the VAG application actions.

APPLICATION SERVER INTERFACE (ASI)

The telephony system connects to the VAE through the Application Server Interface (ASI) 200 of FIG. 3. These connections are the trunk channels over which telephone calls are transmitted. In addition, Simplified Message Service Interface (SMSI) 205 is a separate signalling link over the serial I/O port that conveys information relative to the telephone calls, such as source and destination identification. The ASI 200 handles multiple calls at one time, performs all the logic, and contains all the states for each call. The number of message servers configured in an ASI system is a function of the number of connected trunks. Each ASI can connect to a minimum of one T1 carrier with twenty-four channels in the United States and to CEPT with thirty channels in Europe.

Compression and decompression of voice traffic to and from the trunk channels also occurs in the ASI 200. The ASI does not provide disk storage for the voice messages. Voice messages are sent to the Host for storage and retrieved from the Host 210 when requested. The voice messages are always be conveyed between the ASI and the Host 210 in a compressed form, with a compression ratio of five to one plus pause compression. Clear channel mode(1) is included in the VAE architecture.

ASI is built on a RISC/6000 base and uses standard IBM components, with the addition of required cards for switch connections and voice compression. The ASI consists of:
  Voice Card Set 260,
  Voice Driver 270,
  Signalling Driver 280,
  Cache Manager 300,
  Node Manager 310,
  State Table Manager 320,
  Prompt Directory Manager 330, and
  Data Base Interface Manager 340.

Voice Card Set

The Voice Card Set performs voice compression/-decompression and signalling management on multiplexed telephone channels. It consists of the following cards:

VOICE SERVER CARD (VSC):

Performs voice signal processing and interfaces to the ASI RISC System/6000 Host. It contains a master signal processor (SPM, or SP0) and five slave signal processors (SPS, or SP1–SP5). Three slave processors are located on a daughter card.

TRUNK INTERFACE CARD (TIC):

This is the VSC daughter card that performs the interface between the VSC and the multiplexed digital telephone line. There is a version for T1 and a version for CEPT. The TIC features an Intel 8751 microcontroller.

VOICE SERVER CARD ADAPTER (VSCA):

Plugs into the microchannel bus and acts as an interface between the Host 210 and the VSC 260. The VSCA has no processor, and it can be thought of as a translation mechanism between the microchannel bus and the VSC bus 260. The VSC 260 and TIC combination is referred to as the VPACK. The VPACKs (up to six) reside in a 7866 rack-mount modem package.

Voice Driver

The Voice Driver code is written as an AIX device driver. It operates synchronously with the voice card set, fielding interrupts and moving voice data and status information to and from the voice card set. The interrupt routines perform the following functions:

Read the status of each channel;
Move raw voice data to and from the appropriate channels;
Move encoded voice data to and from appropriate channels;
Retrieve voice signals from cache for playing cached prompts;
Receive and send signalling information for each voice channel;
Process signalling information for each voice channel;
Read and write VPACK card level status and commands; and
Field and post alarm conditions.

Signalling Driver

The Signalling Driver software 280 is the code that interfaces with the SMSI 205 in order to process messages to and from the Central Office (CO). SMSI is the telephone company's protocol for messages that travel to and from the CO.

There are four types of messages that travel to and from the CO. They are:

CALL HISTORY:
Travels from the CO to the ASI. Information that identifies a call as it comes into the ASI 200 from a CO on a T1 line.

MESSAGE WAITING INDICATOR (MWI):
Travels from the ASI to the CO. It signals the CO to light the message waiting lamp, initiate a stutter tone on the customer's telephone, or turn off the message waiting lamp.

NEGATIVE MWI:
Is the response from the CO to the ASI that the CO is unable to process the corresponding MWI message.

UPDATE SWITCH:
Travels from the CO to the ASI. It requests the transmission of all pending MWI messages from the ASI.

Channel Processes

Channel processes are the vehicles for the ASI's application logic with one active Channel Process for each active session. The Session Manager is the primary execution component in the Channel Process and is responsible for interpreting the user's application script into a script table. The application script, which is prepared using the VAG, consists of actions, parameters, and a table of conditional program flow parameters for the various possible return codes, or edges.

Examples of edges include: key x pressed, caller hung up, and time out. Code for the State Machine and all the actions is re-entrant and is shared among all Channel Processes. A portion of a typical state table is shown in FIG. 4 for the bus schedule.

INTERNAL STATE TABLE:
The first state table (internal state table) executed is hardcoded in the State Machine. It contains the following actions:

| | |
|---|---|
| IDLE | Wait for notification from the Node Mgr. |
| ANSWERCALL | Get the user profile, get the state table, then answer the call. |
| PLACECALL | Get the user profile, get the state table and place the call. |
| ENDCALL | Ensure the line is on the hook, reassign the line to the Node Manager, and do any other cleanup work that is needed. |

At Channel Process start-up, the State Machine is called with a pointer to the hardcoded internal state table and the first entry executed is the Idle action. When notified, Idle wakes up, checks if the request is to answer or place a call, and then returns the appropriate return code to pass control to the AnswerCall action for incoming calls. All the actions that follow depend on the return codes. These return codes indicate that an action is complete or that some external event has occurred.

When the entire transaction is complete, the CloseSession action is executed. This is the last action that is performed in a state table, at which time, control is returned to the State Machine's internal state table. The State Machine then executes the EndCall action and then, again, the Idle action.

The State Machine also supports nested state tables. By defining state tables, the user can develop a library of commonly used functions and link them together to create larger and more sophisticated applications. This is accomplished by making the State Machine recursive and by using the CallStateTable and ExitStateTable actions.

Cache Manager:
The Cache Manager controls the storage and mapping of memory for voice segments. Voice segments are stored in shared memory. The amount of cache required to store voice segments is determined by the customer's application requirements. The system configuration facility permits the adjustment of the amount of cache.

Caching is transparent. The requesting function is presented with a pointer that indicates a list of voice segment pointers. If the voice segment is already in memory, the return is immediate. If the voice segment is not in memory, the first segment is retrieved from the Host data base and its pointer is passed to the requesting function. The Cache Manager continues to read in the rest of the voice segment independent of the requesting function.

The Cache Manager stores voice data in 4K buffers and contains two control blocks. The first control block is a directory that contains a series of maps that describe the location of each of the voice segments in memory. The second is a short-term control block that is used to make a logical connection between the segments that are requested and their requestor(s).

An adjunct process called compress voice segments run at predetermined intervals to reorganize the cache memory in order to recover memory space that has been unavailable because of fragmentation.

Node Manager:
The Node Manager is considered the parent of the other processes running in the ASI, including the Channel Processes. The Node Manager is responsible for loading and initializing the entire system; reading and interpreting initialization parameters from the system tables; and reading permanent voice segments, state tables, and prompt directories into memory. It assigns Channel Processes to events when activity is indicated on an idle voice channel and serves as the catcher for unsolicited requests that come from the Host. Exceptional conditions, such as alarms and alerts, are processed first by the Node Manager. The Node Manager also sets a deactivated status on selected channels for maintenance.

The buffer pool, which is managed by the Node Manager, is a pool of 4K buffers available for allocation to other system managers and Channel Processes. Any process, such as a Channel Process, or any system manager requests a buffer through a function call. Then, when the process or manager no longer needs its 4K buffer, it returns it with another function call.

State Table Manager:

The State Table Manager provides access to state tables and maintains copies of as many state tables as needed, up to a predefined limit. The Channel Process accesses state tables to interact with calling parties. If a Channel Process requests a state table that is not currently in memory, the State Table Manager requests that state table from the data base and notifies the Channel Process when it is available.

The State Table Manager continues to read in state tables until the predefined number is in memory. When this number is reached, the State Table Manager replaces the non-active tables with new tables. If there are additional requests for state tables that are not in memory, the State Table Manager removes the least recently used state table, if not currently in use, and requests the new one to be read. The Channel Process is responsible for notifying the State Table Manager when it is no longer using a state table.

Other features of the State Table Manager include processing an invalidate state table request, which means that a state table has been updated by the VAG, and differentiating between tables that are fixed in memory from those that are not.

Prompt Directory Manager:

The Prompt Directory Manager provides access to prompt directories and variable segment directories, and maintains copies of as many prompt directories and variable segment directories as are needed, up to a predefined limit. The Channel Process accesses prompt directories and variable segment directories to play prompts for calling parties.

If a Channel Process requests a prompt directory and a variable directory that are not currently in memory, the Prompt Directory Manager requests them from the data base and notifies the Channel Process when they are in place. The Prompt Directory Manager continues to read in prompt directories and variable segment directories until the predefined number is in memory. If there are additional requests for prompt directories and/or variable segment directories not in memory, the Prompt Directory Manager removes the least recently used ones, if not currently in use, and requests the new ones to be read.

The Channel Process is responsible for notifying the Prompt Directory Manager when it is no longer using a prompt directory and a variable segment directory. Whenever a prompt directory is updated, the Prompt Directory Manager is notified. If the prompt directory is in memory, the Prompt Directory Manager flags it as invalidated. A subsequent request from a channel for this prompt directory causes the Prompt Directory Manager to request the updated prompt directory from the data base.

Prompt directories are kept in memory in 4K buffers. The number of 4K buffers required for a prompt directory depends on the number of prompts in the prompt directory and the length of each prompt. There is no limit to the number of prompts a prompt directory may have. The number of 4K buffers a prompt directory can occupy is limited by the number of 4K buffers available.

Prompt directories are either permanent or temporary. Once read into memory, permanent prompt directories stay fixed in memory. Temporary prompt directories remain in memory until the memory they occupy is needed to satisfy other prompt directory requests or the Prompt Directory Manager is notified by the Node Manager that it must release 4K buffers. In either case, only temporary prompt directories that are not currently in use are released.

Data Base Interface Manager

The Data Base Interface Manager provides the interface between the ASI processes and the data base servers. The common protocol for processing all requests for data base service and the responses to these requests is the Data Processing Request Block (DPRB).

DPRB Structure

The Data Base Interface Manager maintains a control table to keep track of outstanding requests that require response from the data base servers. The information contained in this table includes:
Requestor id
DPRB number; and
Time of the request.

The requestor id enables the system to return the request once the Data Base Interface Manager gets a response from the data base servers. Requests and responses may consist of a single DPRB or multiple DPRB's. The time of the request allows the system to pinpoint when a request has timed out. There are some requests that do not require a response from the data base servers. These requests are passed on to the servers without recording them in the control table.

The amount of memory required by the Data Base Interface Manager for the control table is a function of the maximum number of requests that require a response and the maximum length of time the Data Base Interface Manager is required to wait for a response before declaring a time out and returning the request to the requestor.

HOST SYSTEM

The Host system consists of the following subcomponents:
Data Base Management System
Message Router
VAE Data Base Servers
Custom Servers Data Base Management System The Data Base Management System consist of the Data Base Service Manager function and the indexed sequential and sequential file structures. The Data Base Service Manager, or server, receives DPRB's from, and sends DPRB's to the Data Base Interface Manager. Data base servers provide various data base services to the ASI and the VAG. These services include retrieving, creating, deleting, and updating data in a file, as well as performing various data base backup and recovery functions.

Figure 5:
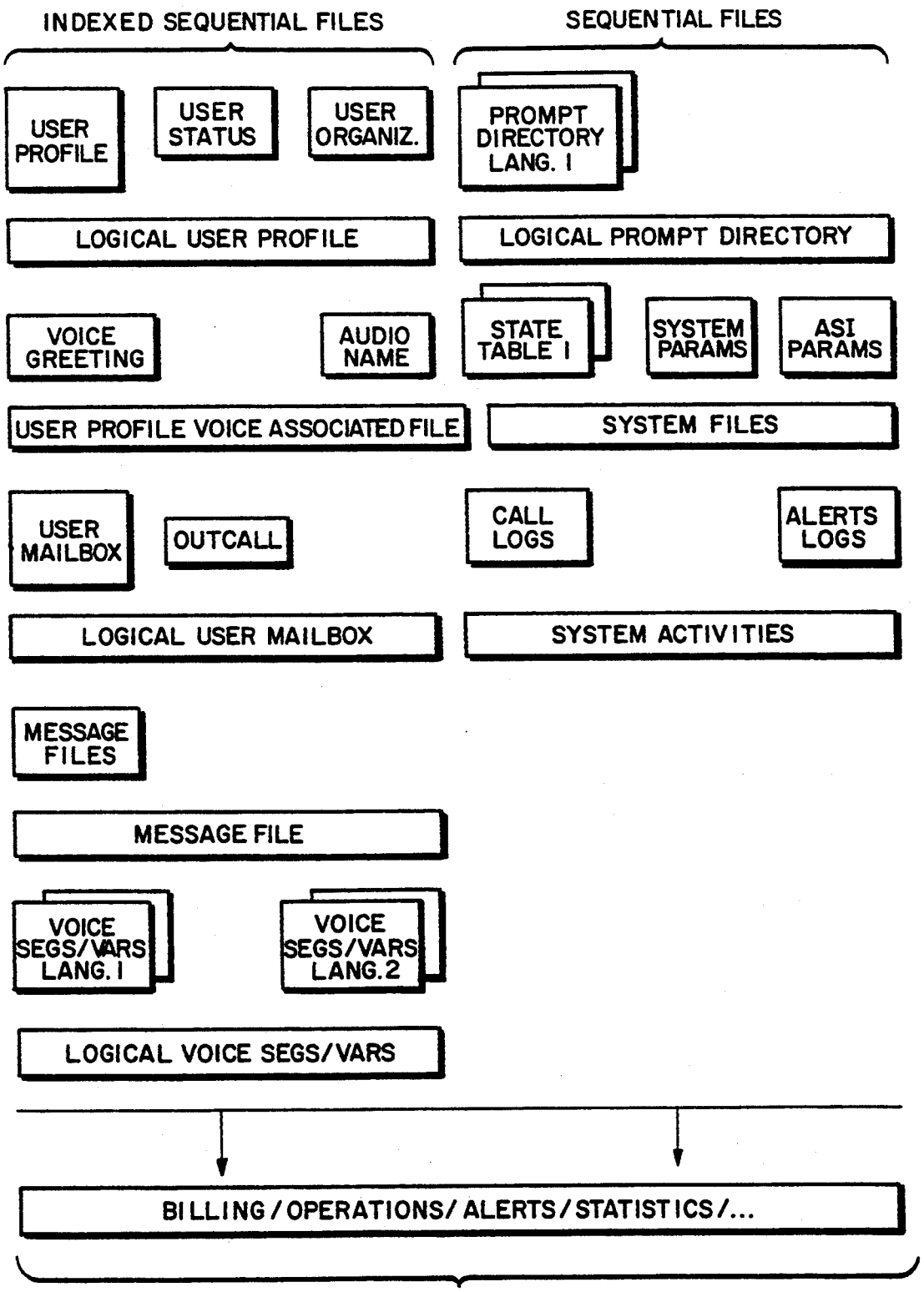
FIG. 5 is a block diagram of the data base files in accordance with the subject invention.

The Data Base Service Manager and the indexed sequential and sequential files access methods provide data access functions. FIG. 5 illustrates an overview of the data base files and their relationship to one another.

Overview of the Data Base Files

A file can be accessed for services at the file level, the record level, or the field level, depending on what access method is used to implement the file. For example, the indexed sequential access method is used primarily to access a file at the record level. If there is no need to access a file at the record level, the sequential access method is used. User profile files and mailbox files are accessed at the field level.

Message Router

The Message Router is implemented as an AIX queue where messages are forwarded to the AIX queue by the Data Base Interface Manager. The messages, which are the service requests from either the ASI or the VAG, are formatted in either the direct or indirect form. The direct (or long) form is where the input parameters are contained within the message itself. The indirect (or short) form is where the input parameters are contained within the DPRB.

In either case, the data base server searches the queue for its request based on the message type and receives it into its task space for processing,

Data Base Servers

There are four data base servers in the VAE system. They are:
State Table and Prompt Directory Server;
User Profile/Mailbox Server;
SGAM Server; and
VAG Server.
STATE TABLE AND PROMPT DIRECTORY SERVER:

The State Table and Prompt Directory Server retrieves a state table, a prompt directory, or a variable segment mapping file from the data base and returns it to the ASI through the Data Base Interface Manager. The server uses the sequential file access method to accomplish this task.
USER PROFILE/MAILBOX SERVER:

The User Profile Server retrieves, updates, or deletes a record of a user profile file for the ASI through the Data Base Interface Manager. A record within a user profile file can be updated at the field level. For all functions, with the exception of retrieval, the ASI can request the server to return an acknowledgment of completion. The server uses the unique user id to search for a record in the user profile file.

The Mailbox Server contains the mailbox data base that provides the link between the user profile files and the message files. The mailbox data base is a collection of mailbox entries, or message headers that describe each message that arrives at the VAE. Pertinent information that is contained in the message header includes the message id, the sender's id, the receiver's id, and the message status code.
SGAM SERVER:

The Segment/Greeting/Audio Name/Message (SGAM) Server retrieves, creates, updates, deletes, queries, renames, or copies a data unit for ASI through the Data Base Interface Manager. A data unit can be a voice segment, a greeting, an audio name, or a message. Each voice segment, greeting, audio name, and message contains a set of voice records, and can be searched by a unique key. For example, the unique key for a voice segment is composed of a segment id and a sequence number.

With the exception of retrieval and query, the ASI requests the SGAM Server to return an acknowledgement of completion. The server uses the indexed sequential file access method to search for a data unit. Voice segments are stored in different files according to language code and compression ratio, greetings and audio names according to compression ratio, and messages according to recording date and compression ratio.
VAG SERVER:

The VAG Server retrieves, creates, updates, or deletes either a record in a file or a file. An example of a file might be a state table or a prompt directory. An example of a record of a file might be a voice segment in a voice file or record in a user profile. For all functions, with the exception of retrieval, the VAG requests the server to return an acknowledgment of completion. The server primarily uses the sequential access method to access files and the indexed sequential access method to access records in files.
Custom Servers:

In addition to the standard VAE data base servers, the following two special servers allow customers to connect their own applications to the VAE system:
3270 Server
General Purpose Server
3270 SERVER:

The IBM 3270 Server is a turn-key method of interfacing the VAE with existing Host-based applications that use 3270-type displays. Other methods require the customer to develop custom interface routines. The VAE uses the AIX Host Connection Program (HCON) to support the functions of the 3270 Server. Communication with the Host is provided by an AIX systems network architecture (SNA) service's token ring and synchronous data link control (SDLC) links through the RISC/6000 token-ring and multi-protocol adapter.

Up to twenty-six concurrent sessions are supported by token ring or SDLC links. Any 3270 terminal or controller supported by AIX HCON may be used by the VAE. To create an application, the customer uses the VAG to customize the ASI interaction with the 3270 Server. To accomplish this, the customer uses VAG functions such as Host session parameters, logons, expected Host sequences, error handling, and data field locations and types. Neither programming expertise nor the use of a compiler is necessary to create VAE applications using the 3270 Server.
GENERAL PURPOSE SERVER (GPS):

The General Purpose Server (GPS) is a construct designed to provide open-ended access to the facilities of the VAE. It is used to support local and remote data base access through the use of custom servers. In general, the customer is responsible for creating the custom servers needed using the Custom Server User Interface in conjunction with his/her own programming logic and the VAE Application Generator.

The resulting custom server operates within the Host or pseudo-Host component of VAE. Server logic is provided in the form of source or object modules specified by the customer using a compatible programming language processor, such as: COBOL, FORTRAN, C, or PASCAL. Any operating system service or facility may be used, with the condition, that the design must conform to the performance requirements of the application.

Interaction with the VAE telephony environment is provided automatically using the pre-processor phase of server build. In a server development session, the customer's logic modules are imported, the Host interaction is specified with the front-end script, and the combined specification is submitted to the build process.

The GPS design can be explained by dividing it into two parts: the GPS components and the GPS architecture. This section provides a brief description of the GPS components followed by an overview of the GPS architecture. The GPS components are:

APPLICATION PROGRAM INTERFACE (API)
  This interface module is part of the VAE system and is stored in a library in the VAE system data base.
USER APPLICATION MODULES (UAM)
  These interface modules are a collection of routines supplied by the customer to provide access to the existing customer application system.
GPS PREPROCESSOR
  This is an Application Specification File parser composed of AWK programming files.
APPLICATION SPECIFICATION FILE (ASF)
  This file defines and specifies the parameters and information necessary to generate the custom server. It is created by the customer using the Custom Server User Interface.
APPLICATION FUNCTION/SUBFUNCTION FILES (ASF), (AFF)
  These files contain the function id for the customer application system and the information for invoking the User Application Modules. When creating a custom server, the customer is responsible for providing the User Application Modules and creating the Application Specification File. The GPS provides the remaining components and all the processing necessary to generate and implement the custom server.

Figure 6:
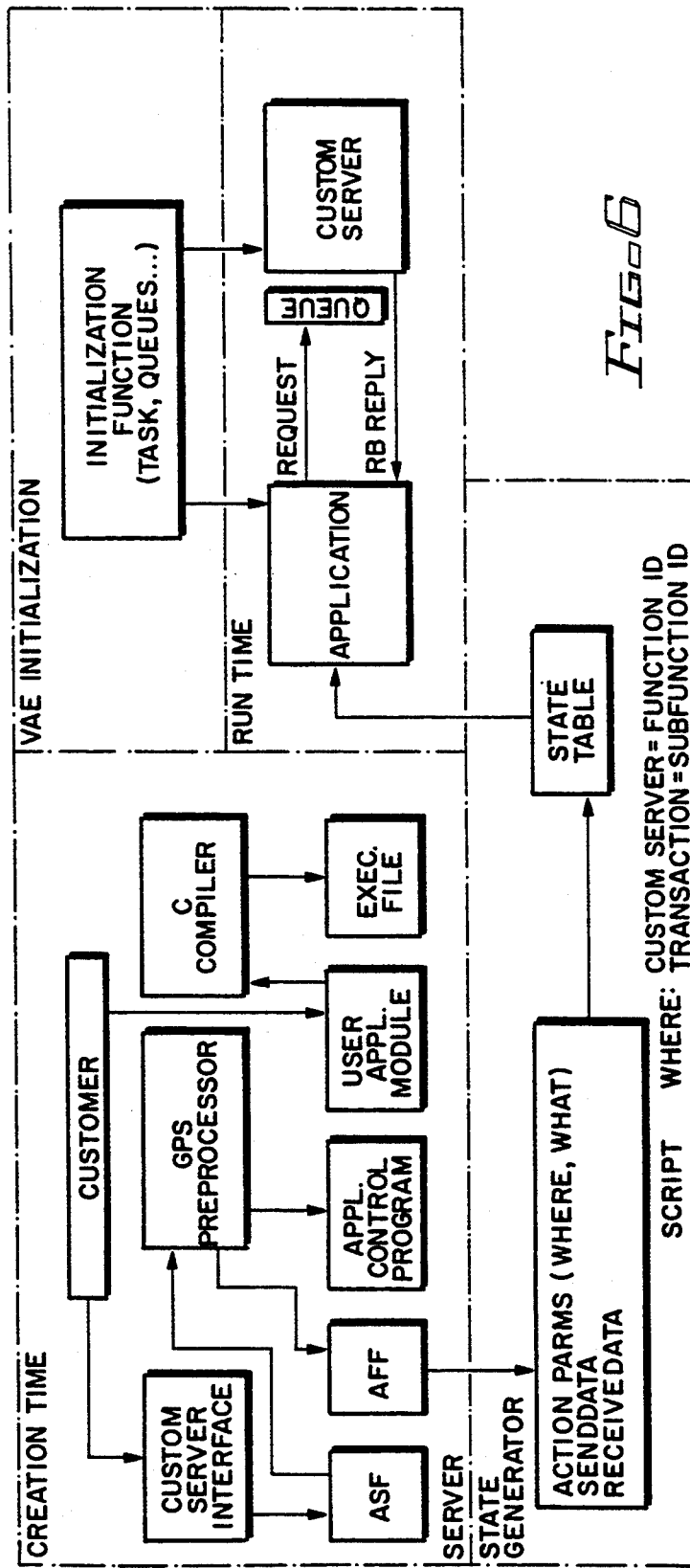
FIG. 6 is a system diagram of the general purpose server development process in accordance with the subject invention.

The GPS design architecture is illustrated in FIG. 6. The GPS is divided into four stages:
  Custom server development;
  Script processing;
  VAE system initialization; and
  Runtime facilities.

Custom server development consists of creating the Application Specification File (ASF) and storing it in the VAE system data base. This is implemented using the Custom Server User Interface. When the Application Specification File is created, it is subjected to a BUILD process.

During the BUILD process, the GPS Preprocessor reads the Application Specification File (ASF) and generates the Application Function/Subfunction Files and the Application Control Program. The C compiler compiles the Application Control Program and a MAKE utility links it with the User Application Modules to build the executable file as the custom server.

The script processing consists of generating a script with the action parameters necessary to link the application with the custom server. The main action parameters are the SendData and ReceiveData actions. Also, when generating the script, the script reads the Application Function/Subfunction Files and uses the Custom server (bus scheduling) and subfunction name (get-city, get-schedule) to generate the script.

The Application Function/Subfunction File directs the script programmer to give input parameter(s) as needed by the subfunctions. At VAE initialization, the system sets up the system parameters and allocates the resources necessary to implement the custom server. Finally, at runtime, the application runs the script table, sends the RB (request block) that contains the custom server number (function id), the transaction number (subfunction id), and the parameter data to the custom server. The custom server then parses the parameter data to the input parameters and passes the input parameters to the customer application system.

When the customer application is complete, the custom server passes the RB header and the return parameter back to the VAE application.

OPERATIONS, ADMINISTRATION AND MAINTENANCE

Operations, Administration and Maintenance (OAM) functions for the VAE system includes configuration management, performance management, and error management. OA&M performs the following functions:
  Provide a console interface for system operation and command execution;
  Statistics collection;
  Statistics reporting; and
  Error management.

Console Interface

The OAM Console Interface provides the environment for the system administrator to continuously monitor the status of the VAE system. It also allows the system administrator to take appropriate action in response to alerts and warnings. The status information is displayed graphically and refreshed at regular intervals. Status information includes:
  Percentage of buffer pool available;
  Percentage of disk space in use;
  Number of active lines on each VSC and the status of each line;
  System performance statistics such as voice segment cache memory requirements; and
  System configuration information.

The OAM Console Interface operates in the AIX-windows(TM) environment. The screen controls and options are grouped by function and purpose and are activated by input from either the keyboard or the mouse. The main screen is divided into three areas:
  Menu bar;
  System status display area; and
  User selected status display area.

The system administrator may execute administrative commands to change the configuration and/or operational characteristics of the system. Administrative commands include:
  Start, stop, or block a channel;
  Start or shut down the system;
  Control system resource usage (request buffer release);
  Request reports;
  Change system parameters;
  Add, modify, and delete user profiles and mailboxes;
  Define classes of service; and
  Direct the console display to other devices.

Statistics Collection

Collection of statistics concerning system operation and resource utilization is accomplished by a process that executes on a periodic basis. This process reads shared memory locations and interfaces with other processes; such as, the Node Manager and the State Table Manager.

Data accessed by this process include the:
Buffer pool;
Disk space;
Voice segment cache completion percentage;
State table hit/miss ratio;
Prompt directory hit/miss ratio; and
Trunk error performance.

Statistics Reporting

In addition to the error logging process described earlier, OAM records events in an event log. The event log includes call completion records, console operations events, and threshold violations.

Error Management

The VAE error management system fields all detected errors in the system. Each hardware and software component is designed to identify error conditions. For example, the VSC continually monitors the trunk status and presents error conditions (in the form of alarms) to the VAE software. Similarly, each VAE software component tests for invalid inputs, system-related failures, illegal requests, or resource availability problems. While the architecture allows VAE to present err_enroll as an interface to the custom server writer, the Prototype does not allow the customer to use this error recovery service.

VAE SOFTWARE ERROR RECOVERY

Coverage of VAE software identified failure conditions is targeted at 100 percent. That is, all identified error conditions are detected and recovery actions is assigned. All recovery actions can be grouped into the following five general types of recovery procedures:

Logging;
Process local recovery;
Multiple process recovery;
Single process restart; and
System restart.

In the event that a software module receives invalid input, the VAE may log the problem, disregard the transaction, and notify the requestor of the error condition. An intermittent failure, such as a failed data base query, may initiate a process local recovery procedure, in which case, the requesting process may retry before escalating the problem to OAM.

A shortage of shared buffers in the buffer pool may require a multiple process recovery procedure. In this event the requesting process notifies a system management process, such as the Node Manager, which, in turn, requests other processes to free unused buffers to make them available to the original requestor.

Recovery for VAE software failures caused by data corruption, logic errors, or exceeding designed boundaries is to quiesce the Channel Process, if possible, and re-initialize it. This is an example of single process restart. The same is true of failures caused by event overflows or a missed interrupt. The error management system can generally restart any failed non-system management VAE process. A failure in system management processes requires a full system restart.

AIX AND SYSTEM HARDWARE ERROR RECOVERY

Coverage of non VAE problems is limited to those errors detected by AIX and the hardware. AIX and system hardware errors may or may not be recoverable. Disk and controller failures, memory checks, bus checks, and other hard errors are almost always fatal. Fatal errors require manual intervention. When intermittent errors occur during normal software execution, the software may retry at least once before escalating the problem to OAM.

Failures caused by insufficient resources may or may not be fatal. Recoverable conditions, such as a disk full conditions causes all attempts to record voice or update user profiles to fail. Under such conditions, and when more 3270 emulation sessions are required than are currently enabled, a system busy announcement may be played, if specified by the customer script, and input is declined until resources are available.

Error conditions that occur at the telephone line trunk interface (VSC) is analyzed and a determination of Red Alarm, Yellow Alarm, or Alarm Indication Signal is made. The occurrence of a Red Alarm causes the VAE system to disconnect all calls on the unit and make all channels busy at the originating end for the duration of the condition. The VAE system automatically restores service after the alarm has been cleared.

Certain conditions can trigger a flood of error that can overwhelm the logging device (or Host). Provisions are made to set thresholds for error reporting. These threshold settings are variable and can be reset. The console operator is notified of the state of all channels and about all errors. The operator then diagnose the error and initiate the appropriate error recovery action.

SYSTEM ADMINISTRATOR FACILITIES (SAF)

The SAF is a VAE application that allows the system administrator to establish, maintain, and support the following system functions:

Application Profiles;
Administrator Profiles;
National Language Support Setup; and
System Configuration.

The SAF is menu-driven and is essentially a graphics workstation application using AIXwindows as the basis for its design. Access to the SAF is from the main default window for the VAE applications.

Application Profiles

An application profile, is used at ring time to set up the actions that are performed after the telephone is answered. The most important information stored in the application profile is the state table id (the application to run) and the entry point in the state table. The application profile is stored in the same file as the user profile. Unlike the user profile, it does not describe the user; instead, it describes the application.

The application profile user interface consists of a panel where the system administrator enters the profile data. This panel consists of a list of the existing application profiles and the actions: ADD, DELETE, MODIFY, and SEARCH. On the right-hand side of the panel is a work area where the application profile information is entered and displayed. The system administrator may select an existing application profile from the list and perform an action on it, or by using the ADD action, She may create a new profile.

Each application profile includes:
Phone number;
Application name;
Comment field;
Language ID;

State table to be used with the application;
Release number for the state table; and
Entry point into the state table.

National Language Support (NLS) Setup

The VAE system processes, simultaneously, applications consisting of multiple languages. For this reason, the National Language Support (NLS) setup program is designed and implemented. The NLS setup program duplicates an application in a new language and then allows the system administrator the option of updating the application using the new language. NLS is designed in the same way as the other SAF programs using AIXwindows.

When NLS is selected from the SAF menu, the system administrator is able to modify screens for an existing language or create screens for a new language. There are two parts to the NLS program. The first part allows the system administrator to change the language displayed in the panel fields of the application. Using the NEXT action on the NLS panel, she is presented with each panel field that can be translated. Examples of these fields are MODIFY and DELETE.

The second part of the NLS program is the translation of the application text into the new language. The system administrator is presented with each panel of the application, where she can change the language of the text for each panel. Examples of the text that is translated are state purpose, action name, and edge name.

In addition to changing the language of the text for an application, the system administrator can also change the playback characteristics of the voice information for the chosen language.

System Configuration

System configuration is a menu option that allows the system administrator to edit configuration parameters. The configuration parameters are grouped by logical component. Default configuration groups are:
VAE configuration;
ASI configuration;
VSC configuration; and
Language configuration.

The configuration panels for all the groups are the same: on the left-hand side of the screen, appears a list of parameters to select from; and on the right-hand side, there is space to alter the selected parameter.

VAE CONFIGURATION:

VAE configuration consists of system parameters that define the operating characteristics of the VAE system. The VAE configuration program stores and displays these system parameters so that they can be accessed by the system administrator when modifying system configuration.

The VAE configuration program allows the system administrator to configure the system at initial startup and to reconfigure the system when there are modifications. System configuration includes the tasks of choosing the disk space used for recording messages and setting time outs for timed actions. Like the other programs discussed in this section, VAE configuration is a menu-driven program that uses a graphics panel user interface.

ASI CONFIGURATION:

ASI configuration consists of parameters that define the operating characteristics of ASI. The ASI configuration program stores and displays these parameters so that they can be accessed by the system administrator when modifying ASI configuration.

The ASI configuration program allows the system administrator to configure ASI at initial startup and to reconfigure ASI when there are modifications. ASI configuration includes the tasks of specifying the size of the 4K buffer pool, determining the size of cache, and selecting the number of voice cards. Like the other programs discussed in this section, ASI configuration is a menu-driven program that uses a graphics panel user interface.

VSC CONFIGURATION:

The VSC configuration program allows the system administrator to configure the VSC at initial startup and to reconfigure the VSC when there are modifications. VSC configuration includes the task of setting information related to telephone connection, such as the compression type, the number of lines per trunk, and the types of trunks. Like the other programs discussed in this section, VSC configuration is a menu-driven program that uses a graphics panel user interface.

LANGUAGE CONFIGURATION:

Language configuration refers to the way system configuration parameters are defined for each language. English functions as the basic language. Using the language configuration, the system administrator describes how to play variables such as numbers, dates, time, currency, and telephone numbers. For example, the voice format for date includes in which portions of the variable are played (day of week, day of month, month of year, and year), as well as the qualifiers for the variable (day of month as an ordinal or a cardinal number). In addition, a Variable Mapping Table allows the system administrator to define the smallest, or "primitive" elements of the variable (such as months of the year and days of the week).

Utilities Module

The Utilities Module provides report printing for selected system data files, such as user profiles, application profiles, and system administrator profiles.

USER ADMINISTRATION FACILITIES

The UAF is an interactive program that allows the system administrator to create and maintain the:
User profile;
Messages sent list; and
Messages received list.

User Profile

The user profile function allows the system administrator to create and maintain the data that defines each user. This data is contained in the user profile. Each user profile is uniquely identified by a user id (phone number/extensions) and a mailbox id or id's (a user can have more than one mailbox). Using the user profile function, the system administrator can:
Search for a user profile in the user profile list;
Select a user profile from the user profile list;
Specify the contents of the user profile data fields;
Add a user profile to the user profile list;
Modify an existing user profile in the user profile list;
Delete a user profile from the user profile list; and
Select a mailbox maintenance functions.

Messages Sent from a Mailbox

This is a mailbox maintenance function that lists the messages sent by each user in the VAE system. Using the messages sent list, the system administrator can search for a message in the list.

Messages Received in a Mailbox

This is a mailbox maintenance function that lists the current messages received by a user in a given mailbox. Using this function, the system administrator can:
   Search for a message in the list;
   Delete selected messages from the mailbox; and
   Clear all messages from the mailbox.

VOICE APPLICATION GENERATOR

The Voice Application Generator is the tool used for the Voice Application Enabler (VAE) application generation. It is a graphics workstation typically used by the application developer to create, modify, and customize voice applications. The VAG main functions are:
   create and modify voice segments;
   create prerecorded system messages known as prompts;
   create state tables that promote the application flow and define edge and default conditions;
   maintain and test voice applications;
   provide links between the 3270 Server and other Host-based applications; and
   build and implement the custom server.

Through the VAG facility, the application developer creates the original default scripts and prompts when the VAE system is first implemented. This function enables the creation of applications that allow the VAE to function, among its many other application capabilities, as an answering machine, voice messaging system, and voice response unit.

The VAG incorporates a SEARCH function and an on-line HELP system. The SEARCH function provides a list search action for all appropriate VAG routines. The HELP system provides:
   menu-driven, context-sensitive help panel for each menu; and
   An item-level help screen for selected items on each menu.

A display technique that emphasizes selected words in the help text is also provided. The displayed help text is language dependent. The VAG is multi-lingual, menu-driven, and consists of the:
   Application Manager;
   Voice Generator;
   Prompt Generator; and
   State Generator.

Application Manager

The Application Manager maintains the applications that are available in the VAE system. It also manages the state tables, prompt directories, and voice segments that define an application. The Application Generator allows the user to perform the following functions:
   Select an application from the application list;
   Delete an existing application and all its component parts;
   Delete a state table;
   Delete a prompt directory;
   Debug a state table;
   Provide a custom server interface;
   Save a complete application to archive media; and
   Restore a complete application from archive media.

STATE TABLE DEBUGGER:

The state table debugger provides the functions that allow the system administrator to verify the functionality of a given state table, and to determine if and where problems exist within a given state table.

CUSTOM SERVER USER INTERFACE:

The Custom Server User Interface (CSUI) is the tool used for creating, building and maintaining custom servers. It is a graphics workstation typically used by the application developer to develop the Application Specification File. This Application Specification File is the module GPS uses to build the custom server. From the custom server application main screen, the application programmer can elect to browse or modify an existing custom server, or create a new server.

Voice Generator

The Voice Generator is used to create/modify/delete the basic unit of voice. This basic unit of voice is a word, phrase, sentence, or set of sentences and is called a voice segment. There is both a textual representation and an audible representation of the voice segment. The voice segment identifier is the link between the text and the audible voice segment.

The Voice Generator is an interactive program that allows the application developer to:
   Create, modify, delete, and display the textual representation of the words, phrases and sentences recorded as voice segments; and
   Create, modify, delete, and display the digitized voice segments.

The Voice Generator program is divided into two main parts: text editing and voice editing. Text editing consists of editing voice segments in the form of text, while voice editing consists of editing the audible voice segments in the form of digitized voice signals. The Voice Generator user interface consists of two work panels where the text and the digitized voice data are entered.

Figure 7:
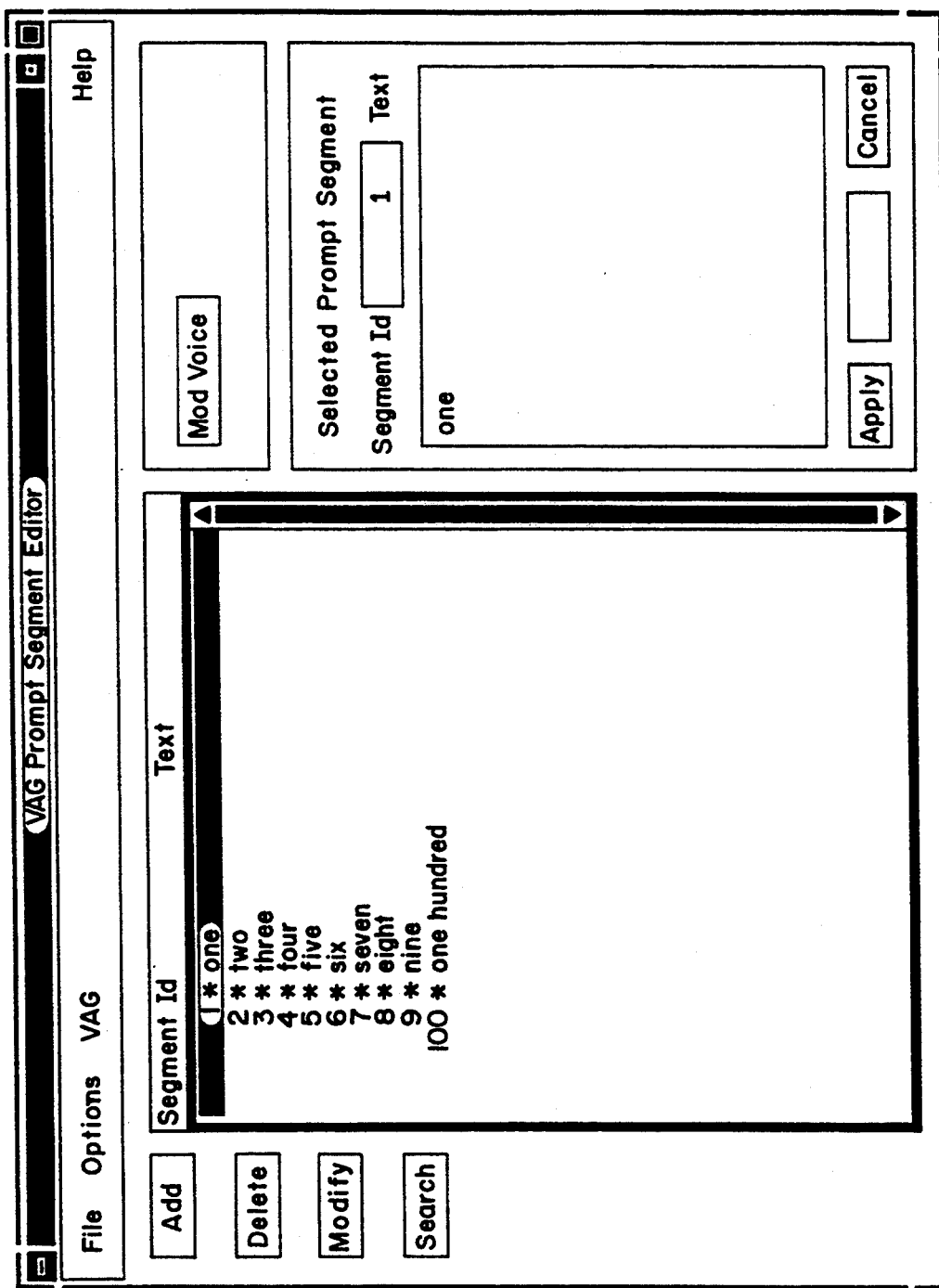
FIG. 7 is an illustration of a prompt segment editor display in accordance with the subject invention.

The first panel, illustrated in FIG. 7, is the VAG Prompt Segment Editor. This display provides the user with a highly visual, user-friendly method of listing and maintaining the textual representation of the voice segments. Using a mouse and keyboard, the user can enter and modify textual representations of voice segments in a simple and straightforward manner. Then, by simply clicking a mouse button when the cursor is positioned on MOD VOICE, the user can change the panel from the textual representation of the voice segment to the digitized voice signal panel. In fact, a major feature of the Voice Generator is the ease in which the user can go from the text to the digitized version of the voice segment, thus working on both versions at the same time.

The second panel is a VAG Digitized Voice Editor panel similar to the panel illustrated in FIG. 7. It allows the user to:
   Select and display one or two voice segments;
   Display all or selected portions of a voice segment using a zoom action, magnify the digitized voice signal for a closeup view;
   Create new voice segments from existing voice segments;
   Delete selected portions of a voice segment;
   Copy selected portions of a voice segment to different places in the voice segment;
   Copy selected portions of one voice segment into another voice segment;
   Switch back and forth between two windows to edit two voice segments simultaneously; and
   Playback and record a voice segment.

Prompt Generator

The Prompt Generator is used to create/modify/delete prompts. These prompts are the recorded sentences or set of sentences that are presented to the subscriber when she communicates with the telephony system. The Prompt Generator is an interactive program that allows the application developer to:

Create, modify, delete, and display prompt directories; and

Create, modify, delete, and display individual prompts.

The Prompt Generator program is divided into two main processes: defining prompt directories and defining the prompts that are listed in the directories. The Prompt Generator user interface consists of three primary work panels where the information necessary to define the prompts and prompt directories are entered.

The first and second panels are the VAG Prompt Directory Editor and the VAG Prompt List Editor panels. These user interface panels provide the user with a highly visual, user-friendly method of listing and maintaining both the prompt directory and the prompts themselves. Using a mouse and keyboard, the user can enter and modify the prompts and prompt directories in a simple and straightforward manner.

Figure 8:
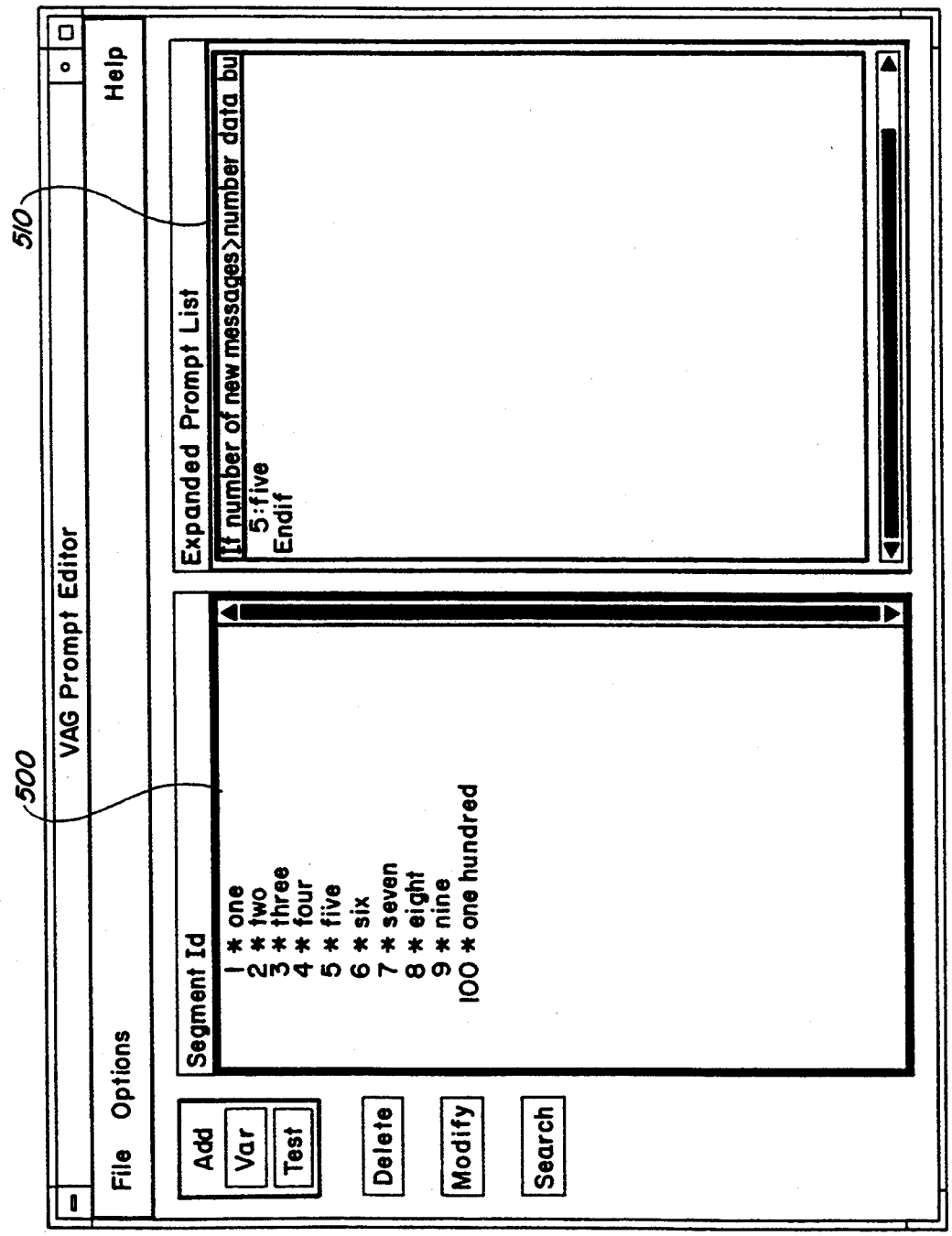
FIG. 8 is an illustration of a prompt editor panel in accordance with the subject invention.

The third panel is the Prompt panel, illustrated in FIG. 8, which is essentially the work area where the prompts are created. It provides the application developer with a list of voice segments 510 in which to build a prompt and the tools to create conditional tests within a prompt. It also provides a list of variables 500 when variables must be played in a prompt. These tools are presented as dialog windows that display the required information. All the user has to do is select the necessary information from the dialog windows. This user interface design provides a highly convenient and efficient way to build prompts from voice segments, variables, and conditional tests.

State Generator

The State Generator is a tool used to create/modify/delete state tables and states. A state is one stage or step in a logical sequence of actions that comprises a telephony application. A state table is a table comprised of these states. A state table provides the VAE with the basic rules to run the application through states, actions, parameters, and edge values.

Figure 9:
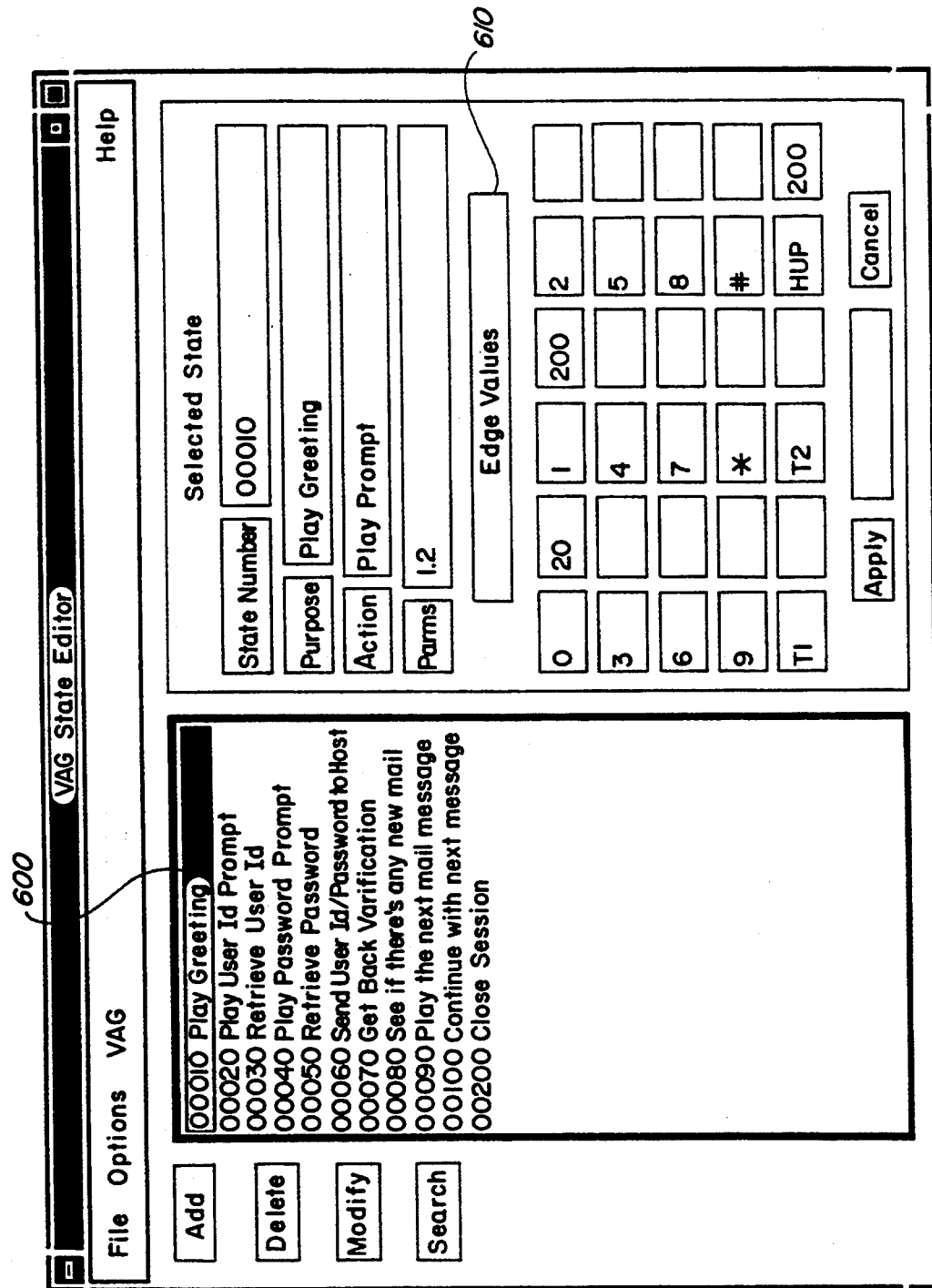
FIG. 9 is an illustration of a state editor panel in accordance with the subject invention.

The State Generator is an interactive program that creates and updates state tables and states. It consists of the VAG State Table Editor and VAG State Editor panels. The VAG State Editor panel is illustrated in FIG. 9. These panels allow the user to:

View the complete state table including the state number and purpose;

Create, add, modify, or delete a state table;

Select a state by number from the list displayed and view the details on the second panel;

Set default options such as preassigned edge values;

Display a complete list of actions and their rules, such as inputs needed that include parameters and required edges Modify an existing state;

Delete an existing state; and

Create a new state.

When modifying or adding a state, the user can select an action from the list of displayed actions or by entering the action in the field provided on the panel. The parameters, if required, are also selected from a list displayed on the panel 600. Then, the State Generator prompts for the edges 610 that are required by the selected action.

When the application is complete, a function called check consistency is enabled. Check consistency monitors:

The validity of the edges that reference an existing state;

The validity and existence of the parameter(s), if needed. For each prompt, a test is performed in all defined languages to verify the existence of this prompt; and The minimum of logic required for a state, such as the existence of a CloseSession action.

VAE APPLICATION ACTIONS

The following is a collection of the actions that are used when defining a state table.

Idle (Internal Action)
AnswerCall (Internal Action)
EndCall (Internal Action)
PlayPrompt
GetKey
GetData
GetText
GetFindName
GetFindPassword
EvaluateData
AssignData
PlayVoice
RecordVoice
SaveVoice
DeleteVoice
CheckStorage
CheckMailbox
UpdateMailbox
UpdateUserProfile
SendData
ReceiveData
GetFindData
CallStateTable
ExitStateTable
Disconnect
CloseSession Each of these actions are discussed below in sections bearing the name of the action.

Idle (Internal Action)

The Idle action is reserved for the internal state table only. This action is run by a Channel Process when it has nothing to do. It causes the process to sleep while waiting on a semaphore to be notified by the Node Manager. When notified, Idle determines whether the Node Manager is requesting the process to answer a call or place a call, and then returns the appropriate edge to the state machine.

| PARAMETERS NONE. | |
|---|---|
| EDGES | 0 = AnswerCall; |
| | 1 = PlaceCall; and |
| | HUP = EndCall. |

AnswerCall (Internal Action)

The AnswerCall action is reserved for the internal state table only. This action initializes the Channel Process to process an incoming call. It retrieves the user profile for the called telephone number, the state table defined in the user profile, and the prompt directory defined in the state table. Then it answers the phone and evokes the State Machine with the state table and the starting edge that is defined in the user profile.

| PARAMETERS NONE. |
|---|

-continued

| | |
|---|---|
| EDGES | EndCall. |

EndCall (Internal Action)

The EndCall action is reserved for the internal state table only. This action cleans up when a session is complete. It ensures that all lines used by this session have been reset (placed on-hook) and reassigns them in the line table back to the Node Manager.

| | |
|---|---|
| PARAMETERS | NONE. |
| EDGES | Idle. |

PlayPrompt

This action builds and plays the voice segments that are defined in the prompt directory. Prompts are played in the language specified in the application profile. Prompts consist of:

- The prompt id number. This number identifies the prompt and is used as the PlayPrompt parameter.
- The force play option. This number indicates whether or not a prompt is force played.
- The time out option. This number specifies the number of seconds the user has to respond at the next GetKey or GetData action.
- The repeat option. This specifies the number of times a prompt is repeated before a T2 time out. A T2 time out initiates a Disconnect action.
- A list of segment ids, system variables, and conditional tests. The conditional test controls what segments and variables are to be played for a particular prompt based on conditions at run-time.

For example, PlayPrompt is used any time the system interacts with the user to give information and directives, or to answer questions. For instance, in a voice messaging system, if the user selects the LISTEN option, the prompt might be: "You have no new messages. You have four old messages. Your oldest message is two weeks old."

| | |
|---|---|
| PARAMETERS | PROMPT NUMBER. There is no default.<br>FORCE PLAY. To force play means to play a prompt completely even when interrupted by a keyed input. Force play is used if there is an important message, such as voice storage is full. In this case, the message is not interrupted. The force play flag exists in the prompt directory. In this case, the force play parameter overrides the flag set in the prompt directory. The default is do not force if a key on the phone pad is pressed. This means that the user can interrupt the prompt by his keyed input if he does not want to listen to the prompt in its entirety. The system then automatically goes to the next step of the application. |
| EDGES | 0 = The prompt has played completely except in the case where a prompt was interrupted by a keystroke. In this case, the prompt does not play completely.<br>1 = There is a voice channel problem.<br>HUP = The caller has hung up. |

GetKey

Getkey is used to receive a keyed input from the caller when a choice of options was given in the previous prompt. The previous prompt also provides GetKey with the number of seconds to wait before time out occurs and the maximum number of times to repeat this prompt before time out. The GetKey action recognizes a single keyed input only.

For example, if the prompt is: "To record, press 1; to listen, press 3; to change personal options, press 8; to transfer out of the system, press 7, then press #", the logical state processed after the above PlayPrompt action is the GetKey action. In this example, key 1 activates a record session, key 3 activates a listen session, key 8 activates the personal options session, key 7 transfers out of the system, while all other keys execute a PlayPrompt stating, "I do not understand this command. Please try again."

| | |
|---|---|
| PARAMETERS | BUFFER NAME. The keyed input is stored in this buffer for future use. The default is use the key for the edge value only. |
| EDGES | 0 = User pressed key 0<br>1 = User pressed key 1<br>2 = User pressed key 2<br>3 = User pressed key 3<br>4 = User pressed key 4<br>5 = User pressed key 5<br>6 = User pressed key 6<br>7 = User pressed key 7<br>8 = User pressed key 8<br>9 = User pressed key 9<br>* = User pressed key *<br># = User pressed key #<br>T1 = Time out<br>T2 = Last repeat time<br>HUP = The caller has hung up. |

GetData

Where the GetKey action is used for a single key input, the GetData action enables the application to receive several keys in a single state step. When completing the input, the last key pressed must be the # key. This action accepts the keyed inputs and stores them in a variable. An edge is returned to reflect the status of the input. The previous prompt also provides GetData with the number of seconds to wait before time out occurs and the maximum number of times to repeat this prompt before time out.

For example if the prompt is: "Please enter your new password. It must be from five to eight characters long", the GetData action requires a keyed input that is a minimum length of five characters and a maximum length of eight characters. The caller must enter a password of from five to eight characters long, followed by pressing the # key.

| | |
|---|---|
| PARAMETERS | |
| PARM 1: | Buffer name in which the input is stored |
| PARM 2: | If the buffer is a character string, this is the minimum length of the input. If the buffer is numeric, this is the minimum value of the input |
| PARM 3: | If the buffer is a character string, this is the maximum length of the input. If the buffer is numeric, this is the maximum value of the input |
| EDGES | 0 = Input length or value is correct<br>1 = Input length too short or value too small |

-continued

2 = Input length too long or value too large
3 = Input incomplete. The # key was not pressed.
T1 = Time out. Nothing was entered.
T2 = Last repeat time
HUP = The caller has hung up.

GetText

The GetText action works much like the GetData action. This action enables the application to receive ASCII text data as input from the DTMF keypad. Two DTMF keys are pressed by the caller to designate a single ASCII character. When entry is completed, the caller must press the # key.

The ASCII text entered during this action is stored in a character buffer. An edge is returned to reflect the status of the entry: too short, too long, or time out occurred while waiting for the input.

PARAMETERS
PARM 1: Buffer name where the input is to be stored;
PARM 2: Minimum length of the input; and
PARM 3: Maximum length of the input.

EDGES
0 = Input successful
1 = Input too short
2 = Input too long
3 = Input incomplete, time out occurred
T1 = Timeout, no input yet
T2 = Last repeat time
HUP = The caller has hung up.

GetFindName

This action is used any time a caller or a message receiver must be identified by digit name or extension number. A digit name is a representation of the user's last name when it is spelled using the alphanumeric key pad on the telephone. GetFindName is used when the caller logs on to system services or when the caller sends messages through system services.

GetFindName makes the identification by matching the caller's keyed input (SMSI caller id(00), digit name, extension number) against a list of user ids generated from the Host. When the extension number or digit name is entered, a minimum number of keyed inputs are received and accepted by the Channel Process for identification. The Channel Process uses the keyed inputs to retrieve a list of user ids from the Host. Then it searches the list of user ids for a unique match.

When GetFindName has identified the caller or destination, it requests the user profile stored in the data base. For example, at log on to system services, the caller has the option of entering a keyed input of pound (#), his extension number, or his digit name. If the caller enters a keyed input of pound (#), GetFindName uses the SMSI caller id and if the caller enters his name or extension GetFindName uses the keyed input for identification.

In any case, when the keyed input is entered, GetFindName uses the list provided by the Host to identify the extension number or digit name. When a caller enters an extension or digit name as the destination when sending a message to another party, GetFindName uses the list provided by the Host in order to identify the receiver so that the message is sent to the correct destination.

PARAMETERS

CALLER'S USER ID. This parameter means that GetFindName is used to identify a caller.
DESTINATION USER ID. This parameter means that GetFindName is used to identify a receiver.

EDGES
0 = Found
1 = Not found
2 = Input incomplete. A time out has occurred.
T1 = No input. A time out has occurred.
T2 = Last time out has occurred
HUP = The caller has hung up.

GetFindPassword

The GetFindPassword action compares the keyed input password with the password defined in the user profile. The last key that is entered must be a # key.

PARAMETERS NONE REQUIRED.

EDGES
0 = Password correct
1 = Password false
2 = Input incomplete (time out)
* = Mistake keyed. Stops the process in the event of a mistake.
T1 = Time out
T2 = Last repeat time
HUP = The caller has hung up.

EvaluateData

This action is used to test the values of system variables with other variables or constants. The flow of the state table can then be altered based on the results of the evaluation.

PARAMETERS
PARM 1: Variable id or constant to test
PARM 2: Variable id or constant EDGES
0 = Parm 1 less than Parm 2
1 = Parm 1 equal to Parm 2
2 = Parm 1 greater than Parm 2
HUP = The caller has hung up.

AssignData

This action can be used in the state table to perform simple arithmetic or string concatenation. It can be used to preset variables to specific values before using them in an action, or as counters in the state table.

For example, the AssignData action can be used to do loop processing. If there are three prompts for a password, then after the first prompt, AssignData is used to loop back to the first prompt. The AssignData action can also be used to pre-assign a variable to a given value before calling another action.

PARAMETERS
PARM 1: Operation (1 Add; 2 Subtract; 3 Multiply, 4 Divide; 5 Assign only.
PARM 2: Variable id of buffer to contain the results
PARM 3: Variable id or constant for the first operand; if Parm 1 is not 5, then also use this.
PARM 4: Variable id or constant.

EDGES
0 = Assignment complete;
1 = Assignment overflowed buffer;
HUP = The caller has hung up.

PlayVoice

Like the PlayPrompt action, this action plays digitized data on the voice channel. It is used to play voice segments, audio names, user greetings, or user messages (voice mail) from either the Host data base or the RecordVoice workspace area. This action is used after recording voice to allow the user to verify what he has recorded before saving it; or, in the case of user messages, it is used before sending the messages to the destination mailboxes. Each user message is assigned an active message number. This is the pointer, which is activated by current message header that is under examination.

PARAMETERS

PARM 1: VOICE TYPE

1 Voice segment (PlayVoice is used only by administrator to record or play voice segments.)
2 Audio name
3 User greeting
4 User message (PlayVoice uses the variable active message number specified by GetKey.).

The following parameters are required depending on the voice type:

VOICE SEGMENT

Parm 2: Numeric buffer name containing the voice segment id
Parm 3: Numeric buffer name containing the language code.

AUDIO NAME

Parm 2: Character buffer name containing the user id.

USER GREETING

Parm 2: Character buffer name containing the user id
Parm 3: Numeric buffer name containing the greeting entry number.

NOTE: For all voice types, Parm 2 can provide the workspace area. The workspace area is where the user can play the voice date that has been recently recorded, before making a decision to record, save, or delete the voice data.

EDGES

0 = Play completed
1 = Voice channel problem
2 = Voice record not found
HUP = The caller has hung up.

RecordVoice

This action is used to record voice as digitized voice data on the system disk into a voice segment, audio name, user greeting, or user message.

The voice data is first recorded into a temporary workspace area from which it can be replayed and verified with the PlayVoice action before storing it at its final destination through SaveVoice.

PARAMETERS

PARM 1: VOICE TYPE

1 Voice segment (RecordVoice is used only by the system administrator to record or play voice segments.)
2 Audio name
3 User greeting
4 User message (RecordVoice uses the variable active message number specified by GetKey.)

EDGES

0 = Recording completed
1 = Voice channel problem
2 = No voice recorded
3 = Disk full
T1 = Time out: xx seconds remaining to record before maximum time is reached. It is specified by the System Administrator.
T2 = The maximum recording time has been reached.
HUP = The caller has hung up.

SaveVoice

This action saves previously recorded voice data for the specified voice type. When recording voice, the data is always recorded into a temporary workspace first. This action copies the voice data from the workspace area to its destination (for example, voice segment id, audio name, or user greeting).

PARAMETERS

PARM 1: VOICE TYPE

1 Voice segment (SaveVoice is used only by the system administrator to record or play voice segments.)
2 Audio name
3 User greeting
4 User message (SaveVoice uses the variable active message number specified by GetKey.).

The following parameters are required depending on the voice type:

VOICE SEGMENT

Parm 2: Numeric buffer name containing the voice segment id
Parm 3: Numeric buffer name containing the language code.

AUDIO NAME

Parm 2: Character buffer name containing the user id.

USER GREETING

Parm 2: Character buffer name containing the user id
Parm 3: Numeric buffer name containing the greeting entry number.

USER MESSAGE

Parm 2: Numeric buffer name containing the receiver id
Parm 3: Mailbox id.

EDGES

0 = Save successful
1 = Save unsuccessful
HUP = The caller has hung up.

DeleteVoice

This action deletes previously recorded voice data for the specified voice type.

PARAMETERS

PARM 1: VOICE TYPE

1 Voice segment (DeleteVoice is used only by the system administrator to record or play voice segments.)
2 Audio name
3 User greeting
4 User message (DeleteVoice uses the variable active message number specified by GetKey.).

The following parameters are required depending on the voice type:

VOICE SEGMENT

Parm 2: Numeric buffer name containing the voice segment id
Parm 3: Numeric buffer name containing the language code.

AUDIO NAME

Parm 2: Character buffer name

USER GREETING

Parm 2: Character buffer name containing the user id
Parm 3: Numeric buffer name containing the greeting entry number.

NOTE: For all voice types, Parm 2 provides the workspace area.

EDGES

0 = Delete successful
1 = Delete unsuccessful
2 = Voice record not found
HUP = The caller has hung up.

CheckStorage

This action is used to check system resources in order to allow an alternate flow through an application based on the resources available. It is normally used at the beginning of an application to determine if there are any storage problems. It is also used before recording to determine if there is space available and whether or not the item already exists.

PARAMETERS
Calling parameters
PARM 1: Resource or item conditions to check:
1 Voice segment exists
2 Audio name exists
3 User greeting exists
4 Mailbox space is available
5 System disk storage space is available Based on the condition specified above, the following parameters are also needed.

VOICE SEGMENT
Parm 2: Numeric buffer name containing the voice segment id
Parm 3: Numeric buffer name containing the language code AUDIO NAME
Parm 2: Character buffer name containing the user id
Parm 3: Numeric buffer name containing the language code USER GREETING
Parm 2: Character buffer name containing a user id
Parm 3: Numeric buffer name containing the greeting entry number in the application profile.

MAILBOX SPACE
Parm 2: Character buffer id containing a user id
Parm 3: 1 Check space for new messages. 2 Check space for saved msgs.

EDGES
0=Condition is true
1=Condition is false
HUP=The caller has hung up

CheckMailbox
The CheckMailbox action checks the mailbox of the specified user id for incoming or outgoing mail. For example, if the message headers for the messages that are stored in the data base contain the sender's user id, date and time the message was sent, and message attributes such as message type and status. The first time the user invokes CheckMailbox, the active message number acts as a pointer to the current message header that is under examination. If the user continues to invoke CheckMailbox, the active message number acts as a pointer to subsequent message headers in the data base. In effect, when, the Check first entry and Check next entry parameters that are defined in the state table are invoked, the most recent message is played first, followed by any older messages.

PARAMETERS
PARM 1:
1 Check first entry
2 Check next entry
PARM 2: (Parm 1=1)
1 Incoming new mail
2 Incoming old mail
3 Outgoing new mail EDGES
0=No messages
1=Messages retrieved
2=Mailbox is busy
HUP=The caller has hung up.

UpdateMailbox
This action updates the message header entries in a message in order to discard or save a received message, to send messages to other user id's, or to update the message's attributes. For example, with this action, the user can alter the selection type of a given message (for example, regular, urgent, or emergency), change the security level of a given message, or update the receiver id.

PARAMETERS
PARM 1: The attribute field to update containing the data to update the field.

EDGES
0=Update complete
1=Update failed
HUP=The caller has hung up.

UpdateUserProfile
This action is used to modify the user profile. Some fields of the user profile can be modified by the subscriber, such as password and selected language; while some fields cannot, such as name and number of messages. UpdateUserProfile allows the selection of the field to update using the parameter field.

PARAMETERS
PARM 1: User profile field that is to be updated
PARM 2: Buffer name containing data that is to be updated EDGES
0=Update complete
1=Update error SendData
This action is used to send data and/or commands to a Host application through the General Purpose Server.

PARAMETERS
PARM 1: Host application function id
PARM 2: Host application subfunction id
PARM 3: The number of variables to send
PARM 4−N: The list of variable ids to send.

EDGES
0=Send completed successfully
1=Send error (ASI pb)
HUP=The caller has hung up.

ReceiveData
This action is used to parse the data received back from a Host application through General Purpose Server.

PARAMETERS
PARM 1: Host application function id
PARM 2: Host application subfunction id
PARM 3: The time out in seconds
PARM 4: The number of variables to receive
PARM 5−N: The list of variable ids to receive.

EDGES
0=Receive completed successfully
1=Host problem
2=No data returned
T1=Time out (no response)
HUP=The caller has hung up GetFindData
This action is used to look up tables on Host systems. The user is prompted for an entry with PlayPrompt, and then this action is called to accept the caller's entry. When a specified number of keys is entered, a request is sent to the Host for a list of table entries that begins with this input. After the list is returned, a search is make in the list for a unique match. More keys can be entered by the caller and the search is repeated until a unique match is found within the list. As soon as a unique match is found, the complete entry is placed in the buffer.

For example, for a list of city names that contains Santa Cruz and Santa Clara, the caller enters the first seven keys of these two city names in order to get a unique match. Once the unique match is found, the entire entry for that city name (in the case of Santa Cruz, the entire entry is nine keys) would be placed in the buffer.

PARAMETERS
- PARM 1: Host application function id
- PARM 2: Host application subfunction id to use to retrieve the data list
- PARM 3: Variable id to accept the data into, as in GetData
- PARM 4: The minimum length of the input to accept before sending the data request to the Host
- PARM 5: Host time out in seconds to wait for a response to the data request.

EDGES
- 0=Input successful, and match found
- 1=No match
- 2=Input incomplete, time out waiting for DTMF input
- T1=Time out. Nothing entered
- T2=Last repeat time
- HUP=The caller has hung up.

CallStateTable

This action is used to invoke another state table from within a state table. The other state table is executed until either a CloseSession action or an ExitStateTable action is invoked. CallStateTable is used to implement a series of actions in several state tables. For example, after creating one state table with a series of actions, CallStateTable can be used to execute these actions from other application state tables.

CallStateTable can also be used to implement a menu for a caller to select which application to run. Then each application can be written in its own state table and called from the menu state table.

PARAMETERS
- PARM 1: Variable id containing the state table id to execute
- PARM 2: Variable id containing the state table release
- PARM 3: Variable id containing the state table entry edge.

EDGES
- 0 to 12=Edge returned by action ExitStateTable
- 13=State table not found
- HUP=The caller has hung up.

ExitStateTable

This action is used to return from a nested state table back to the one that called it. The parameter for this action is the variable id that contains an edge value which CallStateTable is to use as it's return edge. ExitStateTable ends the execution of the current level nested state table and return to the state table it was called from. CloseSession ends execution of all levels of nested state tables, close the session, and return the state machine back to Idle state. If this action is called from a state table that is not nested, the CloseSession action is executed instead.

| PARAMETERS | |
|---|---|
| PARM 1: | Variable id containing the return edge to be used in the CallStateTable action. |
| EDGES | None. |

Disconnect

This action is used to disconnect a caller. Disconnect is used only for specific purposes because a normal end-of-session occurs when the caller hangs up. It can be followed by a CloseSession action or other actions.

| PARAMETERS | NONE REQUIRED. |
|---|---|
| EDGES | |
| 0 = Complete. | |

CloseSession

This action clears all buffers used in the preceding session. It is used as the last action of a session.

| PARAMETERS | NONE REQUIRED. |
|---|---|
| EDGES | |
| 0 = Complete | |
| 1 = Not possible. This process is deactivated. | |

APPLICATION SCENARIOS

This section introduces the application scenarios. The first part discusses the functional characteristics of the application scenarios. The second part illustrates the use of these applications.

FUNCTIONAL CHARACTERISTICS

The VPACK sends the ABCD signalling bits to the voice card driver where, based on the country-specific signalling translation table, the driver translates the bits into the appropriate state and passes the state to the Channel Process or Node Manager. The out-of-band call information signalling includes, at a minimum, the called number. When this call information arrives or a time out condition occurs, the channel goes off-hook the session begins.

If signalling information is unavailable, for example, a not capable, or fails to arrive within the defined time limit after ringing begins, the call is answered and default conditions are assumed. An example might be a customer who wishes to order supplies. The customer is directed to a particular line group, and then navigates through a preliminary voice menu to select the specific VIS application to run. When the caller is connected to his/her application, the application script may present a greeting and prompts for a password. The password is verified by querying the application data base server, and the script proceeds with voice menus, prompting for DTMF responses.

Host interaction is carried out by passing all coded DTMF responses, other than navigational responses, to the data base server. The customer-written data base server may field the request directly or simply pass the request and response to a remote data base server. In this manner, the customer may elect to use existing data base applications and interface protocols.

APPLICATION EXAMPLES

The following sections contain examples of application scenarios: VIS application, telephone service application, and workstation applications.

VIS Application—Bus Schedules and Fares

This scenario is an example of a voice interactive data base application. In this scenario, a consumer calls a listed phone number for a bus schedule and the fare service. Based on the called number identification, the bus schedule script is loaded. In the following system script answer, the words in caps are variables generated from the VAG.

"Hello, this is Global Bus Lines route and fare system. You may back up a step at any time by pressing the start key on your touch tone phone. "To begin, please turn to page THREE of your phone book for the bus terminal location codes. "Using the touch tone keypad on your telephone, please enter the THREE-digit terminal code for the city where your travel begins.

(Customer enters three-digit terminal code.)

"You are travelling from BOSTON.

"Please enter the THREE-digit code for the location where your travel will terminate.

(Customer enters three-digit terminal code.)

"You will be travelling to ATLANTA." "Please enter the day you wish to travel. One is Monday and seven is Sunday.

(Customer enters one-digit day code.)

"You will be travelling on TUESDAY.

"What time of the day do you want to leave BOSTON? Please enter up to four digits using the 24-hour clock, followed by a # sign.

(Customer enters departure time.)

"Departure time from BOSTON is OH EIGHT HUNDRED hours. Arrival time in ATLANTA is TWENTY FIFTEEN hours. Fare is EIGHTY-FIVE dollars and SIXTY-EIGHT cents. "Press the pound sign for the next departure or the star key to respecify your trip. If you need further help, press zero then the # sign, and you'll be transferred to a live operator."

Telephone Service Application

Figure 10:
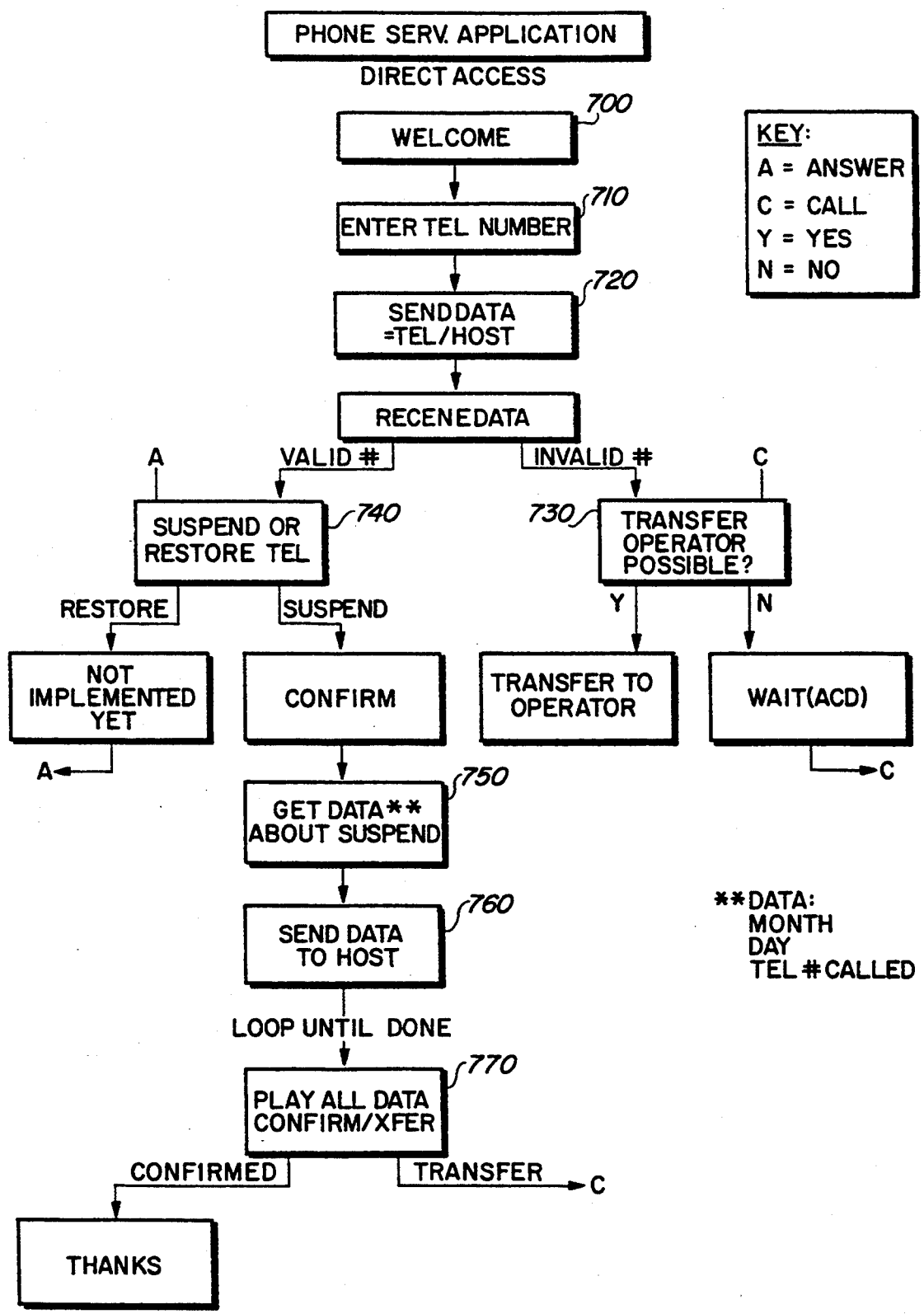
FIG. 10 is a block diagram of a phone service application in accordance with the subject invention.

The flowchart in FIG. 10 illustrates the progression of a telephone service application. From a selection of customer-installed options, the customer is requesting her telephone service be suspended for a period of time. After being welcomed to the system at function block 700, she is prompted to enter her telephone number 710, and any pertinent information relevant to the task he is requesting. This information is sent to the Host at function block 720 for verification and implementation.

If the customer has entered invalid information, she is prompted to re-enter the data at or call a help number at function block 730. If the customer has entered valid information, she receives a message to suspend or restore telephone service at function block 740.

After confirming her option to suspend, she is prompted to enter two telephone numbers and the dates she wants her service to be suspended 750. One telephone number is the number she is calling from and the other is a number where she can be reached in case of an emergency.

This data is sent to the Host 760 where it is processed and stored. Then, a message restating the customer's requirements along with a request for confirmation is sent back to the customer as shown in function block 770. At this point, she can confirm the suspension requirements or transfer to an operator.

Workstation Applications

This section includes examples of the following workstation applications: answering and message taking, message retrieval, message recording, and message delivery.

ANSWERING AND MESSAGE TAKING:

In an answering and message taking forwarded to the VAE, the subscriber's greeting is given to the caller, a message is recorded and stored in the subscriber's mailbox, and the call is terminated.

1. Depending on the profile, the script causes either a standard or personalized greeting to be played. If personalized, the greeting must be fetched from the data base. The compressed greeting is retrieved in segments, decompressed, and then sent on the outbound circuit, with successive segments fetched in pipelined fashion.

2. After the greeting is played, the inbound circuit is opened to receive voice signals while monitoring for on-hook and DTMF tones.

3. As the caller's spoken message arrives, it is compressed into segments and stored in the data base. As each segment is complete, it is assigned a unique identifier.

4. If a key is pressed, the digit is extracted from the stream and processed against the script. This action is either disregarded or followed by a spoken prompt.

5. If the caller hangs up, or if a predetermined time limit is reached, the script causes the ASI to disconnect the telephone circuit. The last message segment is stored and the requisite indexes that are stored in the data base are updated to reflect the addition of the message to the subscriber's mailbox.

6. If the class of service for the subscriber dictates that the arrival of this message requires a notification, the ASI sends a control message to an application in the Host requesting that a notification be scheduled.

MESSAGE RETRIEVAL:

In a message retrieval application, the subscriber calls a service number to gain access to the mailbox services. The most common service used is the retrieval of messages from the mailbox.

1. The incoming call is received at the ASI, together with the called number identifying the service. The appropriate script is selected and activated.

2. The script causes a prompt to be played to the subscriber requesting a keyed identification and password.

3. The DTMF decoding function in the ASI extracts digits and the control function uses them to ensure that correct steps are followed and the pertinent information is collected. Corrective prompts played, when necessary, and the on-hook tone is monitored.

4. When enough information is collected, the presumed profile is accessed from the data base and the password is verified. Upon verification, a prompt is played giving the options of services available. The subscriber then selects the mailbox retrieval.

5. The ASI requests messages from the data base and constructs a prompt that gives the number of messages. This prompt, along with the service options, is played to the subscriber.

6. The subscriber's keyed response causes the messages to be retrieved from the data base. The subscriber can select from two different options: the longer version where he can listen to the entire message, or the shorter version where he can scan the mailbox for the message he wants to listen to. The flow for each option is:

Long version
   Play message header
   Play message
   Delete the message
   Go on to the next message.
Short version
   Play up to four message headers
   Select the message number of the message he wishes to listen to, or skip forward to the next four message headers.

7. Message information is retrieved in segments, decompressed, and played back. The retrieval is scheduled sufficiently ahead of the playback rate to avoid interruptions in the regenerated voice. During playback, the subscriber has extensive key-invoked capabilities for review and spacing.

8. After playback of each message, a disposal prompt is given. Choices include deletion, retention, and forwarding. Extensive prompting is available for each option.

9. After retrieving messages, through key-controlled navigation, the subscriber may go to another option on the main menu. If this is done, or if a disconnection occurs, the retrieval transaction is over. The message data base is updated, and the relevant indexes and the subscriber related information is changed to reflect the actions taken.

MESSAGE RECORDING:

In a message recording transaction, the subscriber records a message to be placed in the mailboxes of other subscribers. The subscriber gains access to this service by calling the service access number.

1. The called number activates the script. The subscriber logs on and, using the keypad, selects the recording function from the spoken menu.

2. The steps taken to receive, compress, and store the message are the same as those taken for a forwarded call. Review and edit capability may be invoked with the keypad. The operation may be abandoned at any time by either keyed selection or disconnection.

3. When the end of the message is reached, a prompt that asks for the destination is played. This is keyed as either a single target or a list of targets. The designation may be an explicit phone number or an alias that references a predefined directory. A list is always aliased. The ASI builds the requisite message index entries and causes the updates Host server to be received into the mail data base.

4. Again, the transaction is ended with keypad navigation to other menu options or with the subscriber going on-hook.

MESSAGE DELIVERY:

When a subscriber accesses VAE in direct-access mode, he can record a message. Then, he must specify when to send the message and the destination of the message.

The VAE has two message delivery types: immediate and scheduled. For the immediate delivery type, the default option is the message is delivered to the receiver mailbox as soon as it is sent. For the scheduled delivery type, VAE allows the option of specifying the date (time, day, month) for the message to be sent. The VAE allows two receiver types. The first is a subscriber identified by a user id (telephone number) or name. The second is a distribution list containing a list of subscribers.

The VAE architecture permits message delivery to a non-subscriber. The system can dynamically create dummy user profiles and mailboxes to store information. Then, through outcalling capability, which is implemented in later releases, the VAE can deliver the message to the receiver. After message delivery, the VAE deletes the dummy information. This function may be implemented in future releases.

SESSION MANAGER DESIGN

The Session Manager design includes the following functions:

Channel Processes;
Internal State Machine including its internal actions;
Application Actions; and
National Language Support for the Playprompt action.

This section provides the design specifications for these functions. At system startup, the Node Manager will FORK( ) and EXEC( ) a single channel process. The first channel process acts as the Session Manager.

The Session Manager performs all the initialization steps that are common to all the channel processes, then these channel processes to the entire ASI system, and after that, it goes back to being a channel process.

The purpose of the Session Manager is to reduce system startup time and provide a simple means of sharing code space for all the Channel Processes. It does this by performing all initialization code that is common to all Channel Processes, and then uses the FORK( ) function to generate the required number of processes.

Application Actions

This section describes the Session Manager application actions. They are:
PlayPrompt
GetKey
GetData
RecordVoice
PlayVoice
CheckStorage
Disconnect
CloseSession.

ACTION_PLAY_PROMPT ROUTINE:

This action builds and plays the voice prompts that are defined in the prompt directory. Prompts consist of the following items:

timeout, in seconds, for the user to respond to the prompt at the next GETDATA or GETKEY action;

number of times a prompt can be repeated before the GETDATA or GETKEY action returns a timeout; and list of segment id's, system variables, and conditional tests. The conditional tests allow control over what segments and variables are to be played for a particular prompt based on conditions at run-time.

INTERNAL STATE TABLE

The State Machine internal state table provides the State Machine with the basic rules to run the IDLE, ANSWERCALL, PLACECALL, and ENDCALL actions. This table is the foundation of the State Machine. All customer defined state tables are envoked by the ANSWERCALL and actions. FIG. 11 shows the internal state table.

System Parameters

The Channel Processes system parameters are:
Number of channel processes to run
Internal state table
Process control block
Blocking number for voice I/O 4K buffers
Timeout number of seconds before time limit is reached
Voice message record stop key
Number of records to chop off at the end of recording leading edge of the DTMF key.

Error Recovery

All errors are logged and/or the Node Manager is notified. Requested UP is unobtainable and request UP for no SMSI information is also unobtainable. For miscellaneous errors, state tables could be defined to handle most error conditions and would provide flexibility without requiring code changes.

NATIONAL LANGUAGE SUPPORT FOR THE PLAYPROMPT ACTION

National Language Support (NLS) setup is a set of rules and programs that play a complex variable in a local custom dependent way. This means that the complex variable is played in a number of different ways. Thus, supporting numerous languages and different language syntax.

The format of data input and output are local custom dependent. Such data includes the numbering system, currency, date formats, time formats and telephone number formats. NLS uses a table-driven design. This eliminates the need to write a new program for each new language or language syntax supported by the system.

Using this approach, the code is independent from the language or syntax; only a new table is required. Examples of complex variables are:
Numbers
Ordered numbers (first, second, and so on)
Date
Time
Currency
Telephone numbers.

How the Complex Variable is Played

Figure 12:
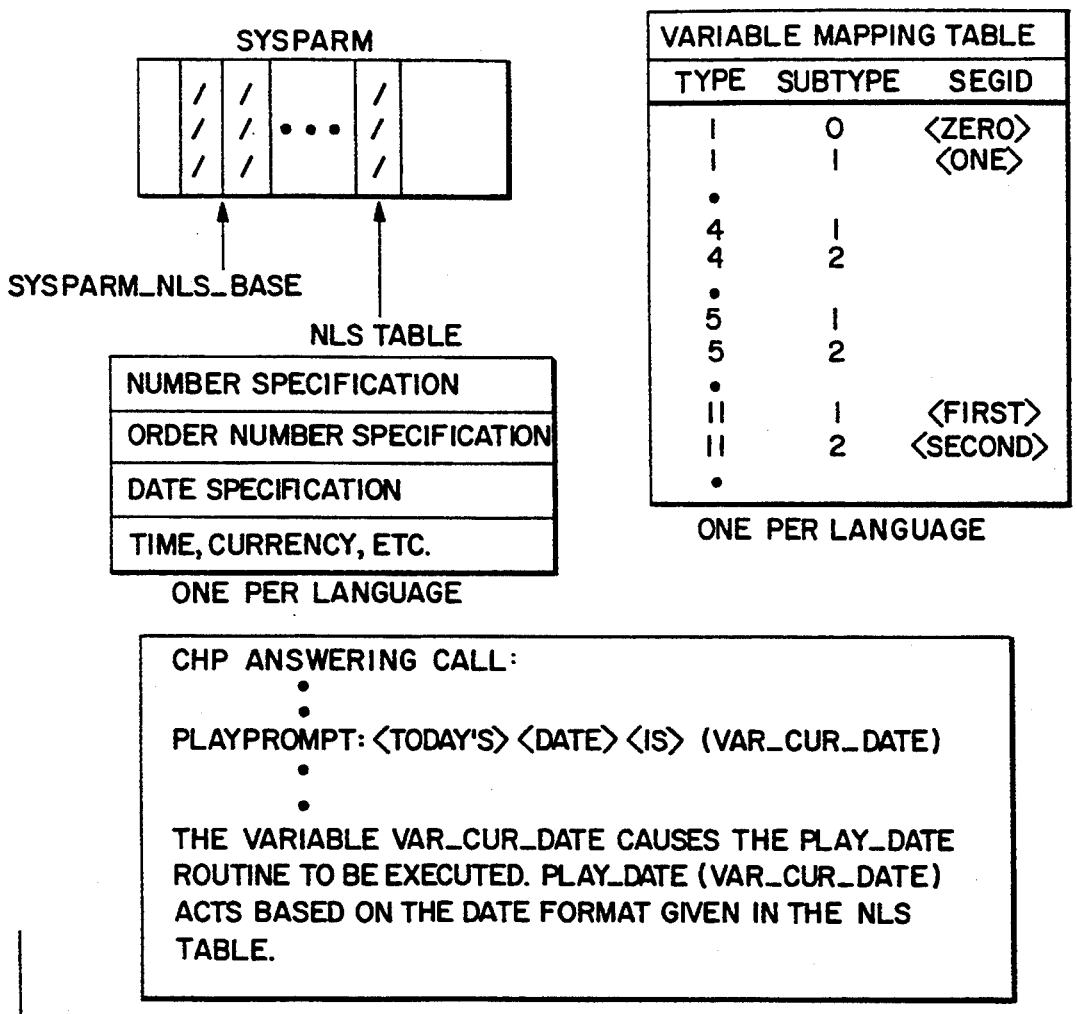
FIG. 12 is a block diagram illustration of a how a complex variable is played in accordance with the subject invention.

FIG. 12 shows how the complex variable is played. Examples of different language syntax are: Number: 20 is expressed as <20> or <2><10> depending on the country. Date: Jun. 6, 1990 is expressed as: <6-><19><90>; <June><90>; <6><Jun.-><1990>; <the><6th><of><Jun.><19-><90>; <national symbol voice><year number>; or <year><6><month><6><day>.

Time: 12 hour time or 24 hour time
Currency $5.25
<5><dollars><25><cents>
<5><dollars><and><25><cents>
<5><yen><25><fen>
Telephone number: 9861234
<9><><6><pause><1><2><3><4>
<98><61><234>

NLS Rules

The language syntax dependencies are based on a set of NLS rules. NLS rules are created by the System Administration Facility (SAF) and loaded by the Node Manager into SYSPARMs. NLS routines use these rules to break down the complex variables into pieces that play the appropriate voice segment.

The NLS rule has a general form in a character array of: <rule meta character><qualifier><optional voice segment(s)>,... The <optional voice segment> can be used anywhere in the specification array except between the meta character and its qualifier. More than one <optional voice segment> can be used in sequence.

The NLS rules are stored in SYSPARMs and loaded by the Node Manager; one set is used per language. FIG. 13 is a table depicting the NLS parameter numbers corresponding to the rules set forth below.

NLS Rule Characters and Qualifiers

The following are the basic elements used in defining the format of a date, time, currency, or telephone number. This is the general form of all NLS specifications:

<rule meta character> <qualifier> <voice segid>
....
/—meta character for words of numbers
9—<billion> for value of 1,000,000,000
8—if there is a single word for 100,000,000
7 ... 1, only if there is a word for the value
d—day of the month
1—play as PP_VARID_NUMBERS (number)
2—play as PP_VARID_ORDINAL (order)
3—play as PP_VARID_DAYSOFMONTH
m—month of the year
1—play as PP_VARID_NUMBERS (number)
2—play as PP_VARID_ORDINAL (order)
3—play as PP_VARID_MONTHNAMES
y—year
1—year played as single number
2—year played as century and decade
3—year played as decade only
4—use the national year
w—day of the week; similar qualifier as d
v<ULONG Segment Id>—Play Segment
h—hour in the day
1—24 hour format as number
2—12 hour (AM/PM) format as number
M—minutes
1 play as PP_VARID_NUMBERS (number)
2 play as PP_VARID_ORDINAL (order)
s—seconds
1 play as PP_VARID_NUMBERS (number)
2 play as PP_VARID_ORDINAL (order)

the following meta characters always have the qualifier '0'

$—currency unit (dollar)
c—currency fraction (cents)
D—play telephone number as digits
g—play telephone number as number by grouping Variable Mapping Table As mentioned before, variables such as numbers, dates, or telephone numbers are considered complex variables. Based on the corresponding playing rules, these variables are broken down into smaller pieces to play as prompts. This process is accomplished using the PlayPrompt action. To identify these primitive pieces, a variable mapping table is used.

All primitive variables are located by using two keys: var_id and var_num. Var_id defines the primary data type, such as: PP_VARID_NUMBERS and PP_VARID_MONTHNAMES. Var_num is usually the numerated value within the type. For example, January has the var_num value of one.

To apply this rule to all 256 possible languages, an NLS variable mapping table is defined in the Host data base for each supported language. This table is organized with three columns:

Var_id—such as PP_VARID_MONTHNAMES (short)
Var_num—such as January, enumerated with short type
segid—voice segment id This table is loaded by the Channel Process as part of prompt directory loading for the current language used. The following list shows all the supported variable types:

| VARID | ITEM CONTENTS |
|---|---|
| PP_VARID_NUMBERS | 1 to 20,30,40,50,60,70,80,90 |
| PP_VARID_HTMB | hund.thou.mill.bill. |

-continued

| VARID | ITEM CONTENTS |
|---|---|
| PP_VARID_MONTHNAMES | Jan.Feb.Mar ... |
| PP_VARID_DAYSOFWEEK | Sun.Mon.Tue.Wed.Thu.Fri.Sat |
| PP_VARID_DAYSOFMONTH | 1st,2nd,3rd,4th ... 31st |
| PP_VARID_TIMEOFDAY | am,pm,o'clock,hours |
| PP_VARID_TIMEOFWEEK | yesterday,today,tomorrow |
| PP_VARID_ALPHABET | A,B,C,D, ... |
| PP_VARID_NOISE | noise type |
| PP_VARID_SYS_MSGS | voice for system error messages |
| PP_VARID_ORDINAL | ordinal number |

NLS Design Assumptions and Limitations

The following lists the current NLS design features:
Number (example for American English)
  Base 10 (no 24=2 dozens, base 12)
  Only valid entry in NUMSPEC allowed (no 10)
  Primitive Numbers are completed in VARMAP table (0, 1, ... 19, 20, 30, ... , 90, etc.)
Date/time inputs in UNIX format
Currency inputs are floating point number
Telephone numbers are always played as numbers
VARMAP Table
  Completeness is expected from SAF
  No redundancy such as 10 in NUMSPEC in American English or <billion> is not used for <100-0><million> British
NLS rule tables must be correct
No ordinal unit for <millionth> and <billionth>, VARMAP will have <hundredth> and <thousandth>.

NUMBER SYSTEM:

There are two operations to break a number so it can be used as a segment: division and subtraction. VAG creates the number which allows the Channel Process to do these operations. The number formats assume a base 10, with the most significant digit on the left. The range of numbers is from 0 to 4,294,967,295 (size of ULONG) which means that there are at the most 10 significant digits. This internal data structure is not seen by the VAG user. char numspec(60);

The following are the basic elements used in defining the format of a number:
  /—meta character for words of numbers
  9 for <billion>
  6 for <million>
  3 for <thousand>
  2 for <hundred>
  v—followed ky 4-byte voice segment ids
Example of numspec generated for:
  (1) American English
  /9v<billion>/6v<million>/3v<thousand>/-2v<hundred>
  (2) British English
  6v<million>/3v<thousand>/2v<hundred>

This numbering scheme is applicable for both cardinal and ordinal number systems. The only difference between the two systems is using var_id for locating the voice segment. There are two sets of the structure, one for the cardinal number system, and another for the ordinal number system.

DATE FORMAT:

The order of the day, month and year along with their voice segment ids are given in this structure. Date Specification:

datefmt: specifies the play order of day, month and year. If national year used, then SYSPARM 'national_year' contains the base year.
d—day of month
  1 play as PP_VARID_NUMBERS (number)
  2 play as PP_VARID_ORDINAL (order)
  3 play as PP_VARID_DAYSOFMONTH
m—month of year
  1 play as PP_VARID_NUMBERS (number)
  2 play as PP_VARID_ORDINAL (order)
  3 play as PP_VARID_MONTHNAMES
y—Year
  1 year played as single number
  2 year played as century and decade
  3 year played as decade only
  4 use the national year
w—Day of Week; similar qualifier as d
v<ULONG Segment Id>—play segment
The following example shows how the date, Jun. 6, 1990, is played.

| specification | played |
|---|---|
| m3d2y2 | <June><6th><19><90> |
| m3d2y3 | <June><6th><90> |
| d2m3y1 | <6th><June><1990> |
| <the>d2<of>m3y2 | <the><6th><of><June><19><90> |
| <nsv>y4<year>ml<month>dl<day> | is played as: <national symbol voice><year number><year><6><month><6><day> |

TIME FORMAT:

The play order of time units and their voice segment ids are given in this structure.

| Time specification | |
|---|---|
| char | timefmt(20); | specify the order of playing for time elements
h—hour in the day
  1—24 hour format as number
  2—12 hour (AM/PM) format as number
M—minutes
  1 play as PP_VARID_NUMBERS (number)
  2 play as PP_VARID_ORDINAL (order)
s—seconds
  1 play as PP_VARID_NUMBERS (number)
  2 play as PP_VARID_ORDINAL (order)
v—if voice needed to insert in between, then next four bytes containing voice segment id.

The following example shows how the time, 11:30:24, is played.

| specification | played |
|---|---|
| h1M1<and> s1<second> | <11><30><and><24><second> |
| h2M1 | <11><30><am> |

CURRENCY SPECIFICATION:

Two monetary units are allowed; they are dollars and cents. The amount is played as a number with the voice segments of monetary units to make up the currency.
Currency specification
  char moneyfmt(20); /* how to play dollar/cent */
  short dollar2cent; /* converting ratio */ moneyfmt: this field defines the play order of the amount and their monetary unit voices.

$ play the dollar amount 0 no qualifier, always played as numbers c play the cent amount.

0 no qualifier, always played as numbers v insert a voice in between, followed by its 4 bytes segment ID.

dollar2cent: conversion ratio from dollar to cent. For American 1 US dollar=100 cents, and this value is 100. This is a SYSPARM.

The following example illustrates how the amount of currency, $5.25, is played.

| specification | played |
|---|---|
| $<dollars>c<cents> | <5><dollars><25><cents> |
| $<dollars><and> c<cents> | <5><dollars><and><25><cents> |
| $<yen>c<fen> | <5><yen><25><fen> |
| calling sequence: | short play_currency(float money) |
| return true if play is successful | |

The VAG provides all information except the voice segment id for dollar(s) and cent(s) which will be initialized by the Channel Processor.

TELEPHONE SPECIFICATION:

The play grouping method of a telephone number is given in this structure. Within the group, the telephone number is played as numbers. char phonespec(20)=D0D0D0 D0D0D0 D0D0D0D0 calling sequence: short play_phone_number(char *phone)

use to specify the rule to play a telephone number
phonespec: D, g, or v

D—play as a digit, followed by a zero or additional D's for additional digits 0 no qualifier g—play as a group, followed by a zero or additional g's 0 no qualifier v—insert a voice between play. This must be followed by a 4-byte voice segment id.

"—used as a separator.

Given phone number 4085546888:

| specification | played |
|---|---|
| D0D0D0 D0D0D0 D0D0D0D0 | <4><0><8><5><5><4><6><8><8><8> |
| g0g0g0 g0g0g0 g0g0g0g0 | <408><554><6888> |

STATE TABLE MANAGER DESIGN

The purpose of the State Table Manager is to provide state tables to the Session Manager program in to control the progression of a call. The State Table Manager is designed to receive messages from a request queue, send a DPRB to the Data Base Interface Manager requesting a state table, receive the notification that the state table has arrived, and notify the requestor. The program is designed to handle multiple requests, concurrently, and is configured to handle invalid requests and tables that cannot be retrieved.

The State Table Manager program also responds to requests from the Node Manager to release 4K buffers and requests to invalidate state tables. This section describes the following:

Performance considerations

Resources

The interface for requestors of state tables

The pseudo code that defines the State Table Manager Design.

Figure 14:
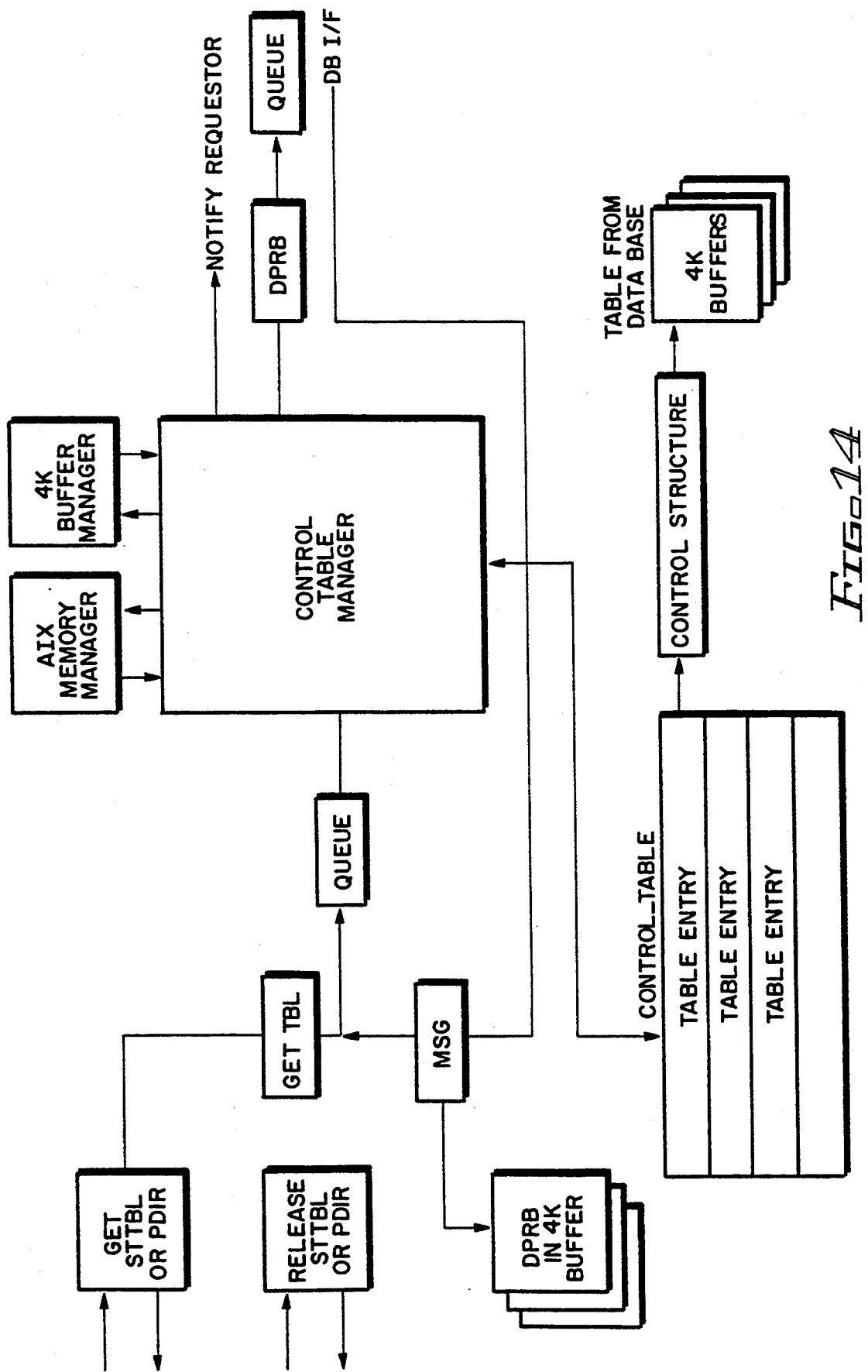
FIG. 14 is a block diagram of the state table managers in accordance with the subject invention.

The State Table Manager and the Prompt Directory Manager share a common table structure and control table design. FIG. 14 is a block diagram showing the data flow including interfaces with other processes and the control table.

COMMON ROUTINES DESIGN

Because the control table structure is identical (except for the entry control structure), many of the functions required for both the State Table Manager and the Prompt Directory Manager are consolidated into routines that both managers call.

The Control Table consists of a block of memory large enough to contain enough entries to allow for a run-time-determined number of tables in memory at one time. The memory for the table is allocated from the AIX memory pool during system initialization such that the table is contiguous memory. Semaphore operations are used to prevent more than one process from updating the control table at one time.

VAG COMPONENT DESIGN SPECIFICATIONS

This chapter contains the detailed design specifications for the VAG internal components. As shown in FIG. 2, these components and their design specifications include:

VAG Performance Considerations
VAG Resources
VAG Server Interface Specifications
VAG Use of Motif and X-Windows
VAG Global Data Structures
VAG Specific Global Variables
Front-End Design
Prompt Generator Design
State Generator Design
Voice Generator Design
Application Manager Design
VAG System Specifications
Utilities.

The performance of the VAG components is subordinate to the call processing functions of the system. This requires the VAG components to operate at a lower priority than call processing tasks and to limit its competition for system resources with the rest of the VAE system. The VAG components are expected to operate during normal loading times without degrading system performance.

VAG RESOURCES

Total available RAM memory and CPU processing power impact the performance of the VAG components. A large portion of the required memory is allocated for code and data structures for Motif and X-Windows. Both Motif and X-Windows are window interface managers for AIX. Future versions of these products are expected to provide shared libraries to reduce the memory requirements for each task.

Both Motif and X-Windows make extensive use of allocated storage. Because of design decisions to transfer complete files to the VAG components instead of accessing individual records and due to the way that the Motif scrollable lists function, large amounts of memory will be allocated, dynamically, by the application. The amount of memory allocated will depend on the actual size of the data base files that are edited.

The VAG programs are not expected to be locked like call processing tasks, but instead, operate as a standard-demand paged virtual memory process. This reduces the demand on the system's RAM memory that is required to run the VAG components. The VAG components must release any resources shared with call processing as rapidly as possible, for example 4K buffer blocks.

The displaying of graphics is CPU intensive because the X-Windows low graphics functions perform floating calculations. So, the floating point processing performance of the target platform has a marked impact on the display speed.

FRONT-END DESIGN

The purpose of the Front-End design is to enable or disable a security access level based on the user's id and password. At the beginning of a work session, from the VAE top-level default screen, the Front-End design allows the user to select the Password pop-up box only.

When the user enters his user id and password in the Password pop-up box and selects APPLY, the Front-end design allows the user to access only those menu that are assigned to him in the Administrator Profile. The password is not displayed as the user enters it. The enabling or disabling of the security access level is controlled by setting the sensitivity of specific menu buttons. Sensitivity also determines whether keystrokes or mouse actions can invoke the function associated with the button.

PROMPT GENERATOR DESIGN

The purpose of the Prompt Generator is to allow a system user to create, update and delete the prompts executed by a channel process. The Prompt Generator provides a graphic user using Motif, to accomplish these tasks. The Prompt Generator creates, updates, and deletes prompts through a DPRB interface with the Data Base Interface Manager.

The Prompt Generator functions at three levels. The first level creates and updates prompt directories. Each prompt directory consists of prompt directory parameters and a list of prompts. The second level creates, updates, and deletes individual prompts in a single selected prompt directory. Each prompt consists of prompt parameters and a prompt body. The third level creates, updates, and deletes the references to the voice segments, prompt variables, and tests that define the prompt body in a single selected prompt.

EDITING VOICE SEGMENTS

Figure 16:
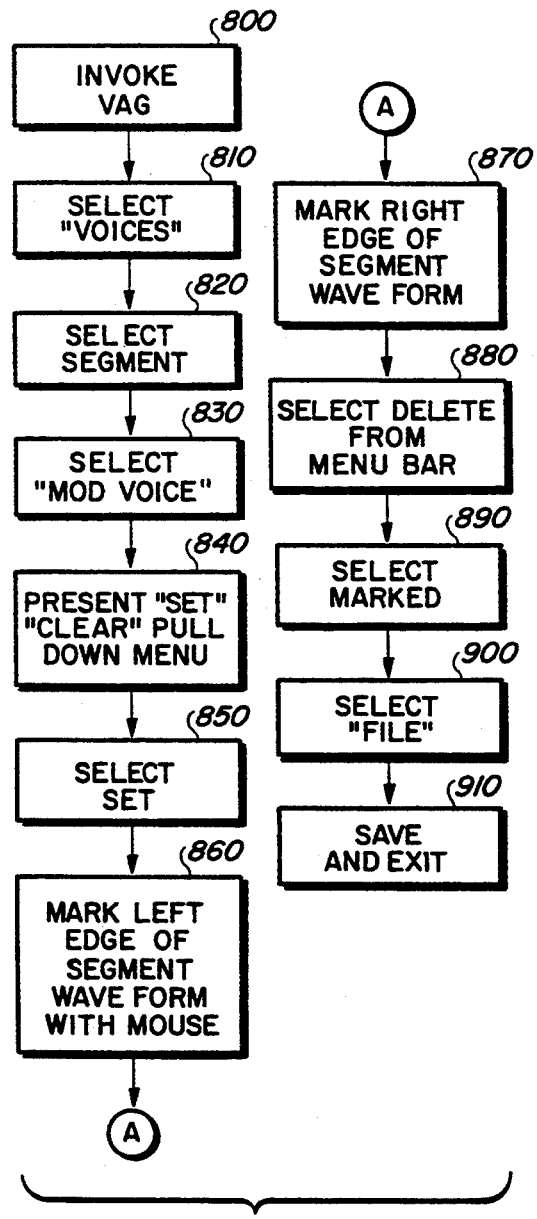
FIG. 16 is a flowchart of editing voice segments in accordance with the subject invention.

To edit a voice segmanet, a user selects the voice editor text editor panel as shown in function block 800 of FIG. 16. The user selects voices in function block 810 and is presented with the list of voice segments which are retrieved by the data base function. In function block 810, the user finds a segment of interest using search or scrolling, and using a mouse, clicks on a segment of interest and selects the "Mod Voice" by clicking on the selection area on the same panel as depicted in function block 830.

The voice application enabler performs the following steps in preparation for editing:
 a. presents the Voice Editor Panel;
 b. requests the allocation of two voice channels on the voice hardware;
 c. places the channels in wrap mode; one for decompression and the other in "clear channel" (i.e., uncompressed) mode;
 d. locates and writes the compressed voice segment to voice channel in decompression mode, and reads from the wrapped channel in clear channel mode. Both the compressed and decompressed voice segments are retained in memory (RAM);
 e. as it is received from the decompression process, the wave form of the decompressed voice segment is displayed in the voice editor panel; and
 f. the duration of the voice segment in playing seconds is calculated from the its physical length and displayed on the editor panel.

A user selects the "Set" action from the editor panel using the mouse as indicated in function block 850 in FIG. 16. Also with the mouse, he marks the beginning and end of the digitized voice segment he desires to modify as highlighted in function blocks 860 and 870. The physical locations in the compressed and uncompressed voice segment are calculated and the MARK'd section is highlighted. These postions are always rounded to the nearest twenty ms. boundary, which in the current implementation are thirty-two and one-hundred-sixty bytes, respectively. The user can then, delete the marked area as shown in function block 880 and 890 and save the resultant as depticted in function blocks 900 and 910.

Alternatively, the user may play the marked portion of the segment by selecting "Play" on the action bar of the Editor Panel. In this case the voice is written to the voice hardware channel which is in clear channel mode and, in turn, is transfered to a headset or speaker. Playing the voice information allows the user to verify that the correct portion of the segment has been selected.

The marked portion may be copied to another segment or deleted by selecting the appropriate actions with the mouse. If the marked portion is deleted, the voice editor rewrites the internal buffers of both the compressed and uncompressed versions of the voice segments, and rewrites the digitized wave form to the panel, resizing the time scale to fit the panel.

If a user desires to copy a whole or portion of a segment into another segment, the first segment is marked, and the user switches to the "Other Window" and INSERTS the COPY'd portion into a MARK'd location of the 2nd segment. The segments are then re-written to their respective buffers and the wave-form panel is regenerated from the uncompressed form of the data.

When editing of the voice sgement is complete, the user selects "Save" from the Action Bar. This action saves the edited compressed form of the segment by writing it in a file, thereby replacing the original. Thus, editing is accomplished without successive decompression and recompression of the stored voice data and without successive distortion in the voice as a result.

PLAYING VOICE PROMPTS

Preparation of the Prompt

Figure 17:
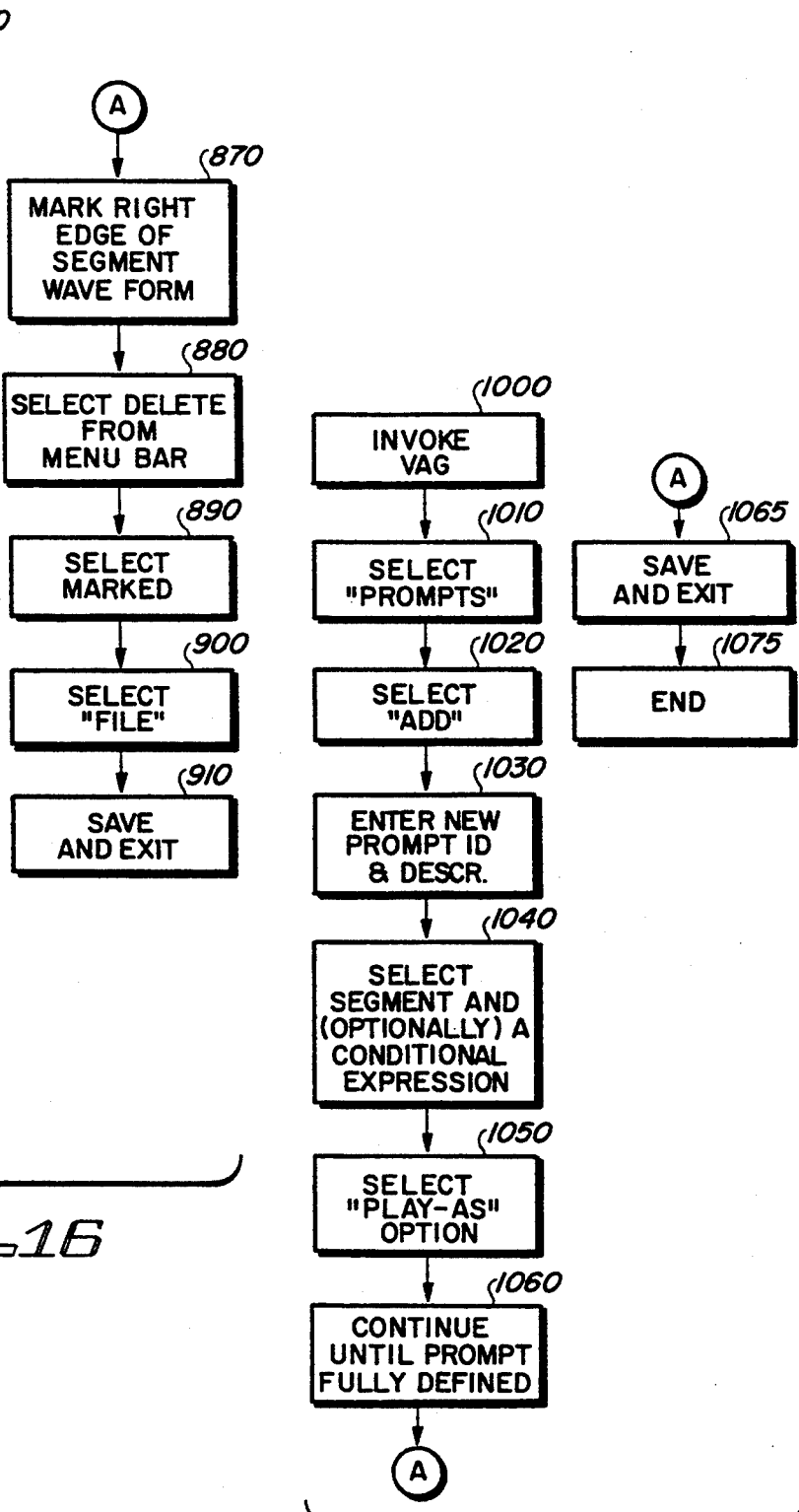
FIG. 17 is a flowchart of national language support setup in accordance with the subject invention.

To prepare a voice prompt the user starts the Voice Application Generator (VAG) by selecting "VAG" with the Mouse on the Motif Menu Bar as shown in function block 1000 of FIG. 17. The user is presented with a pull-down menu with 3 options: States, Prompts and Voices. Then, the user positions the cursor over the "Prompt" and presses the mouse button to signify selection of the function used to define the prompts he wishes to use for his voice application as shown in function block 1010.

The user is presented with the Prompt Directory Editor Panel. The Prompt Directory Editor panel displays a list of all the currently-defined prompt directory entries. By selecting "Options" the user can choose to display or work with alternative versions of the prompt which may have been defined in other languages. Then, the user selects "Add", as shown in function block 1020 from the Prompt Editor Panel. The input subpanel appears on the right of the Editor Panel.

On the input subpanel, the user enters Prompt ID number and Purpose as shown in function block 1030, then clicks on "Apply". Then, the user is presented with a list of voice segments available, and an expanded prompt list to the right of the list, and a selection of relationship operators as discussed earlier. The user selects a voice segment or variable, as shown in function block 1040, and optionally a conditional test which allows the referenced segment to be conditionally played depending on the value of the data in a defined variable (e.g., today's date or time, value entered by a caller, etc.). Complex IF..THEN..ELSE logic is also supported.

If the segment selected is a variable, a pull-down menu is presented which defines the manner in which the data stored in the variable is to be vocalized (i.e., PLAY AS..). The user selects how the variable (segment) is be vocalized (e.g., digit, number, ordinals, currency, date, time, etc.) as shown in function block 1050. Variables used as prompt segments are stored as a combination of the pointer to the variable data plus codes defining how the data will be played.

The user can continue the process discussed above, stringing prompt segments together, as shown in function block 1060, until the prompt is complete. Then, the user clicks on SAVE, saving the prompt for use in the application as depicted in function blocks 1065 and 1075.

Playing Prompts with Complex Variables

Figure 15:
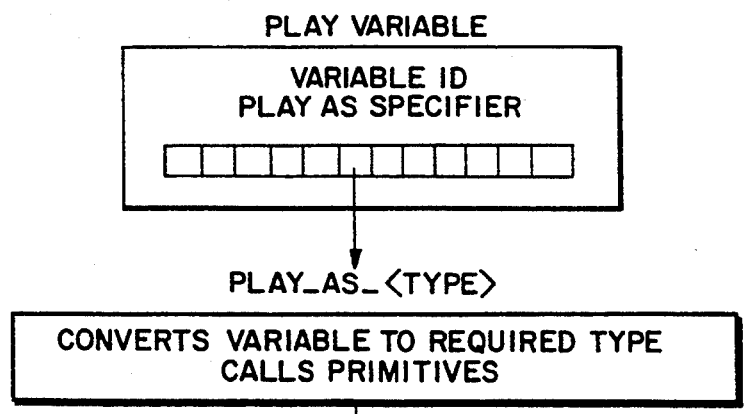
FIG. 15 is a flowchart of a play variable in accordance with the subject invention.
Figure 18:
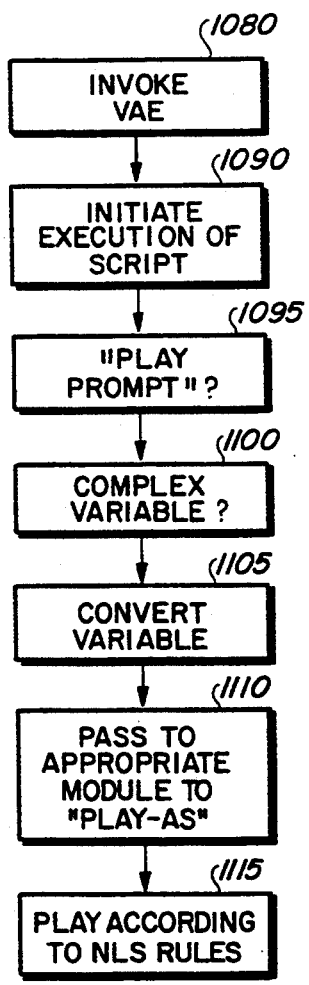
FIG. 18 is a flowchart of national language support application development in accordance with the subject invention.

Application Script is started by a telephone call to the system as shown in function block 1080 of FIG. 18. The script references prompts defined during the application development process as shown in function block 1090. Upon execution of the "PLAY PROMPT" action in the script, as depicted in function block 1095, the VAE SESSION MANAGER steps through the list of segments defined by the prompt. Each type of segment (i.e., static voice or variable) is played according to its "Play AS" specification by passing control to a function defined for that "Play As" type. A flow diagram of this process is illustrated in FIG. 15.

Actual vocalization is performed by reference to system-level segment primitives (e.g., "hundred", "p.m.", etc.) which are derived from the rules established for each language available in the system as depicted in function blocks 1100 to 1115. For example, currency and time are vocalized according to national custom. These primitives are selected, in effect, by parsing the value of the variable according to these rules. Upon completion of a prompt, control passes to the next script action.

Language-Independent Voice Applications

Figure 19:
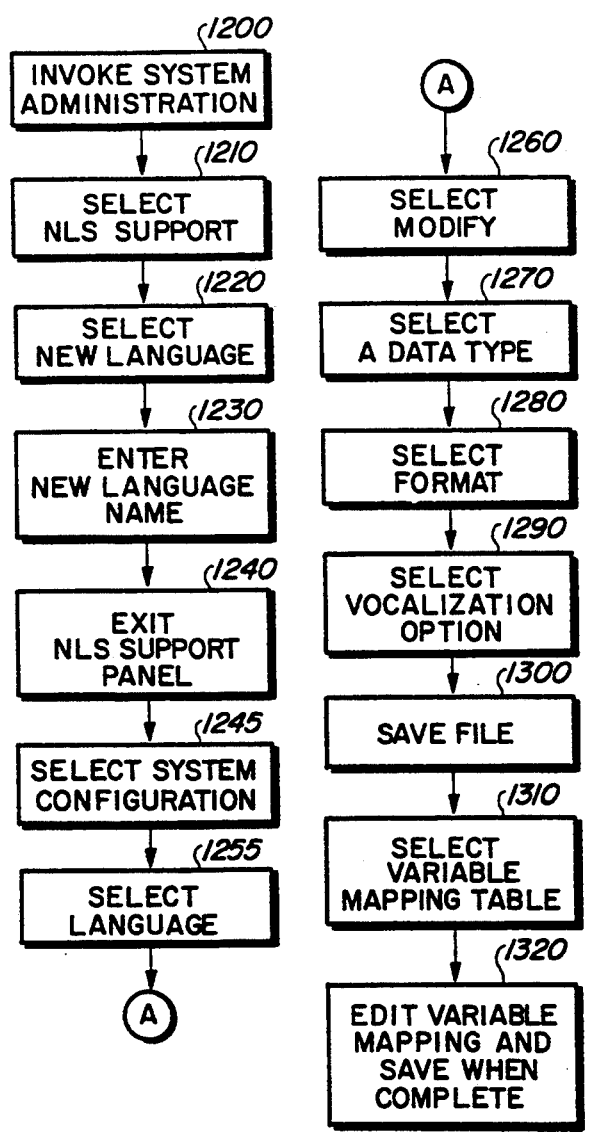
FIG. 19 is a flowchart of national language support execution in accordance with the subject invention.

To define a new application in another language, the system administrator selects the NLS Editor from the main menu as depicted in FIG. 19, funtion block 1200. The Editor panel is presented, with a list of currently-defined languages. English is the base (default) language.

The user selects "Options—New Languages", as shown in function block 1210, and enters the name of the new language to be defined, as illustrated in function block 1220, and clicks on "OK". Then, the system copies the english-based language files into a shadow data base. The system then remaps the display keyboard by selecting "Keyboards" on the NLS Editor Panel. A list of available keyboard mappings is displayed in the Keyboard Selection Panel. The user can narrow the list by selecting "Filter" and the 2-digit code specifying the language of the keyboard of interest (e.g., French) as depicted in function block 1230.

The user then edits the language-based file groups affecting the user (display) interface as depicted in function block 1255 to 1300. These file groups include:
 (a) application developer standard interface terms;
 (b) common VAE user interface terms;
 (c) VAG Editors;
 (d) administrator profile;
 (e) mailbox terms; and
 (f) user profile.

Then, the user edits language configuration parameters (NLS Rules) in the system configuration panel, as shown in function blocks 1310 to 1320, including:
 (a) variable mapping table;
 (b) number format;
 (c) telephone number format;
 (d) currency format; and
 (e) date format.

Application Development (VAG)

Figure 20:
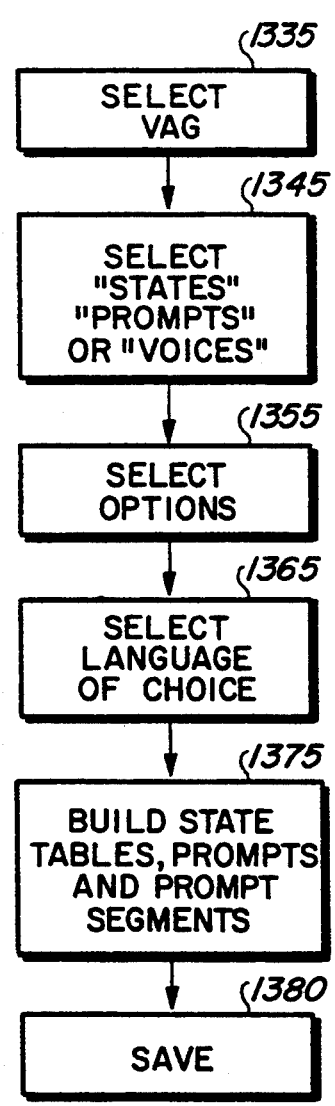
FIG. 20 is a flowchart of preparation for playing complex variables in accordance with the subject invention.

To develop the application after the language tailoring has been completed, the user selects "VAG" from the VAE Sign-on Panel, as shown in FIG. 20 at function block 1335. Then, the user selects one of three voice application development tools, as shown in function block 1345, from the pull-down menu:
 (1) "State Generator" to define application scripts;
 (2) "Prompt Generator" to define prompts to be invoked by the scripts; or
 (3) "Voice Generator" to record, playback, and edit voice segments used in the prompts.

From the application development tool menu, the user selects "Options" in the selected tool at function block 1355, then "Language" in the pull-down menu at function block 1365. Then, the user selects language from the list of defined languages in the pull-down menu. The selected language will be used during the development session. The user can develop applications in her choosed language, including scripts, prompt definitions, and voice prompt segments as shown in function block 1375.

NLS Execution

A script is prepared using VAG as discussed above and is invoked using appropriate signalling (i.e., DID, SMSI, dedicated channel, etc.) interfaces. The script executes using NLS rules for vocalizing prompts. The rules are table-driven and defined in the System Configuration section as discussed above. There is one set of rules per language. The set used is the one corresponding to the active language at the time of script execution.

As discussed in greater detail above, the NLS general form is:

<rule meta> <qualifier> <optional voicesegments> . . .

Rule meta characters and qualifiers include the following:

| Meta Char | Qualifier | Word |
|---|---|---|
| / | 9 | "Billion" |
|   | 8 | 100,000,000 |
| d | 1 | Play as number ("one") |
|   | 2 | Play as ordinal ("first") |
|   | 3 | Play as days of month | etc., (there are meta characters for the year, the time, and for currency)

Complex variables, such those above are, thus, broken down into smaller "primative" pieces to play as individual words or phrases, according to the NLS rules. These primatives are identified according to a variable mapping table, for example:

| Variable ID | Variable Value | Segment ID |
|---|---|---|
| MONTHNAME | 1 | Pointer to "January" |

Figure 21:
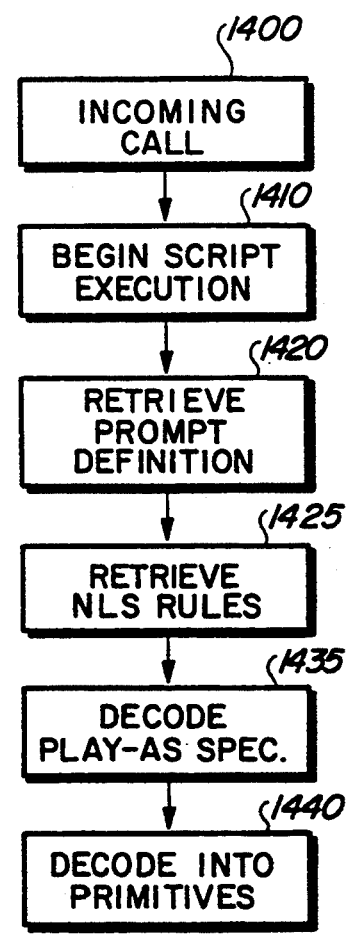
FIG. 21 is a flowchart of a playing complex variables in accordance with the subject invention.

An execution logic NLS flow chart is provided in FIG. 21. An incoming call is detected as suggested in function block 1400. The detection invokes an appropriate script that generates the voice prompt playing as pointed out in function block 1410. To execute the script, the prompt definition and the NLS rules must be retrieved as illustrated in function blocks 1420 and 1425. This information allows the prompt generator to decode the PLAY-AS specifications and decode the complex voice information into primitives that can be played back to the caller as shown in function block 1435 and 1440.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. Apparatus for editing compressed voice information, comprising:
   memory means for storing segments of compressed voice information;
   means for decompressing said compressed voice information and displaying said decompressed voice information on a display, both said compressed information and said decompressed information stored in said memory means; and
   editing means for simultaneously editing corresponding selected portions of said displayed decompressed voice information and of said compressed voice information.

2. Apparatus as in claim 1, further comprising means for copying selected compressed voice information to a voice segment.

3. Apparatus as in claim 1 further comprising means for marking said selected portions of the decompressed voice information for subsequent edit operations.

4. Apparatus as in claim 1, further comprising means for playing back selected portions of the decompressed voice information.

5. Apparatus as in claim 1 further comprising means for saving said edited compressed voice information.

6. Apparatus as in claim 1 further including means for generating a waveform representative of said decompressed voice information, said waveform being displayed on said display, said decompressed voice information being stored in said memory means.

7. Apparatus as in claim 6 further including marking means for marking selected portions of said displayed waveform for subsequent editing operations, said selected portions of said waveform corresponding to said selected portions of said decompressed voice information.

8. Apparatus as in claim 1 wherein said memory means includes means for retrieving said segments of compressed voice information from a data base.

9. Apparatus as in claim 8 further comprising means for saving said edited compressed voice information and storing said edited voice information in said data base.

10. A method for editing compressed voice information, comprising the steps of:
    storing segments of compressed voice information;
    decompressing said segments of compressed voice information;
    storing said segments of decompressed voice information;
    displaying said decompressed voice information on a display; and
    simultaneously editing corresponding selected portions of said displayed decompressed voice information and of said compressed voice information.

11. The method as in claim 10, further comprising the step of copying selected compressed voice information to a voice segment.

12. The method as in claim 10 further comprising the step of marking said selected portions of the decompressed voice information for subsequent edit operations.

13. The method as in claim 10, further comprising the step of playing back selected portions of the decompressed voice information.

14. A method for editing compressed voice information, comprising the steps of:
    retrieving segments of compressed voice information from a data base;
    storing said segments of compressed voice information in a temporary memory;
    decompressing said segments of compressed voice information and storing said decompressed voice information in said temporary memory;
    displaying said decompressed voice information on a display;
    simultaneously editing selected corresponding portions of said displayed decompressed voice information and of said compressed voice information; and
    saving said edited compressed voice information to said data base.

* * * * *

UNITED STATES PATENT AND TRADEMARK OFFICE
CERTIFICATE OF CORRECTION

PATENT NO. : 5,367,609
DATED : February 27, 1995
INVENTOR(S) : Hopper et al.

It is certified that error appears in the above-indentified patent and that said Letters Patent is hereby corrected as shown below:

Column 39, line 45, delete "< >", insert -- <8> --.

Column 41, line 52, delete "ky", insert -- by --.
Column 41, line 58, before "6v", insert -- / --.

Signed and Sealed this

Eighteenth Day of April, 1995

Attest:

BRUCE LEHMAN

Attesting Officer

Commissioner of Patents and Trademarks